United States Patent [19]

Nishitani et al.

[11] Patent Number: 4,942,470
[45] Date of Patent: Jul. 17, 1990

[54] REAL TIME PROCESSOR FOR VIDEO SIGNALS

[75] Inventors: Takao Nishitani; Ichiro Tamitani, both of Tokyo, Japan

[73] Assignee: NEC Corporation, Japan

[21] Appl. No.: 376,901

[22] Filed: Jul. 5, 1989

Related U.S. Application Data

[63] Continuation of Ser. No. 135,528, Dec. 17, 1987, abandoned, which is a continuation of Ser. No. 756,027, Jul. 17, 1985, abandoned.

[30] Foreign Application Priority Data

Jul. 20, 1984 [JP] Japan ................................ 59-150593
Oct. 30, 1984 [JP] Japan ................................ 59-228625
Nov. 7, 1984 [JP] Japan ................................ 59-234545
Nov. 20, 1984 [JP] Japan ................................ 59-245324

[51] Int. Cl.$^5$ ............................................. H04N 5/14
[52] U.S. Cl. .................................... 358/160; 358/166; 358/167
[58] Field of Search ................... 358/160, 166, 167, 22, 358/21 R, 182, 183, 166, 167, 903; 382/41, 42, 43; 364/514, 133

[56] References Cited

U.S. PATENT DOCUMENTS 4,148,070  4/1979  Taylor ................................. 358/160
4,363,104  12/1982 Nussmeier ........................... 358/166
4,550,437  10/1985 Kobayashi et al. .................. 358/166
4,689,676  8/1987  Nakajima ............................. 358/149

FOREIGN PATENT DOCUMENTS 0118053  9/1984  European Pat. Off. .............. 382/41
59-53964  3/1984  Japan .

OTHER PUBLICATIONS

"Motion-Compensated Interframe Coding for Video Conference" by Koga, Hirano, Ohki and Iinuma, in CS81-87, pp. 85-90.
"A Single-Chip Digital Signal Processor for Telecommunication Applications", by Nishitani, Maruta, Kawakami & Goto, in IEEE Journal of Solid-State Circuits, vol. SC-16, No. 4, Aug. 1981, pp. 372-376.
"A 32kb/s Toll Quality ADPCM Codec Using a Single Chip Signal Processor", by Nishitani, Aikoh, Araseki, Ozawa & Maruta, 1982, pp. 960-963.

Primary Examiner—James J. Groody
Assistant Examiner—David E. Harvey
Attorney, Agent, or Firm—Laff, Whitesel, Conte & Saret

[57] ABSTRACT

This is a real time video signal processor for real time digital processing of video signals with a plurality of unit processors. All the unit processors are connected in parallel between an input bus and an output bus. Each unit processor consists of an input section connected to the input bus, a processing section for digital processing of video signals written into the input section, and an output section for supplying video signals processed by the processing section to the output bus. There is provided control sections for generating control signals to command what picture block of each frame is to be written into each unit processor and what picture block of each processed frame is to be outputted. Generally, each unit processor takes in a greater picture block than the picture block to be processed, and each processor independently accomplishes digital processing of the picture block assigned to it without communicating with any other unit processor.

9 Claims, 17 Drawing Sheets

FIG. 3A  SYNC SIGNAL
FIG. 3B  WRITE SIGNAL
FIG. 3C  EXECUTION SIGNAL
FIG. 3D  OUTPUT COMMAND SIGNAL
FIG. 3E  WRITE SIGNAL
FIG. 3F  EXECUTION SIGNAL
FIG. 3G  OUTPUT COMMAND SIGNAL
FIG. 3H  OUTPUT SIGNAL

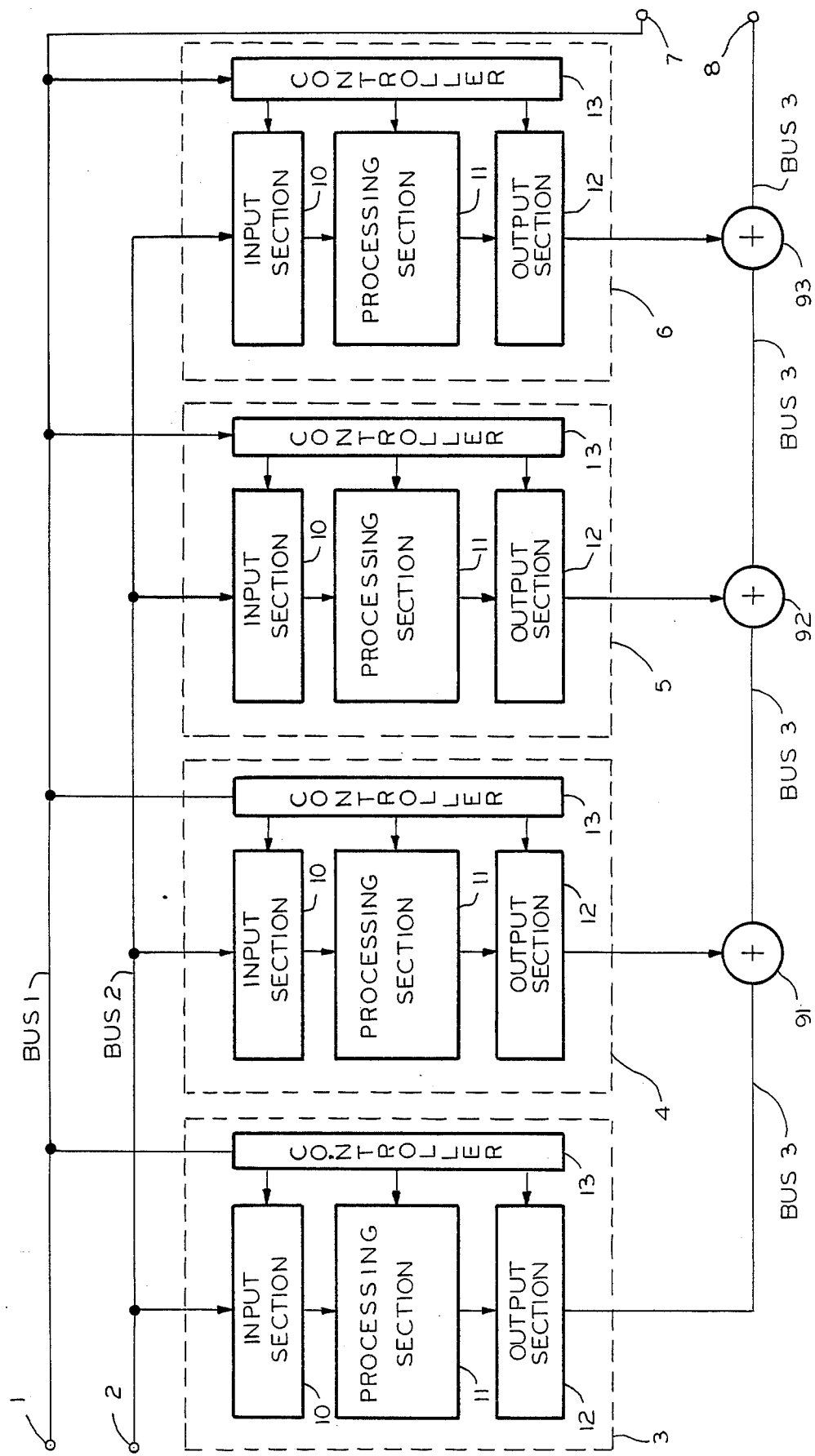

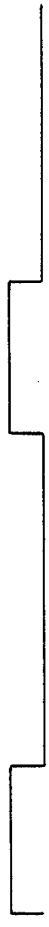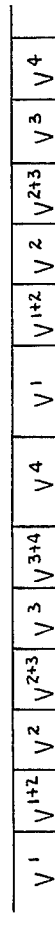
FIG. 9A SYNC SIGNAL
FIG. 9B WRITE SIGNAL
FIG. 9C EXECUTION SIGNAL
FIG. 9D OUTPUT COMMAND SIGNAL
FIG. 9E WRITE SIGNAL
FIG. 9F EXECUTION SIGNAL
FIG. 9G OUTPUT COMMAND SIGNAL
FIG. 9H ADDITIONAL TIMIMG
FIG. 9I OUTPUT SIGNAL

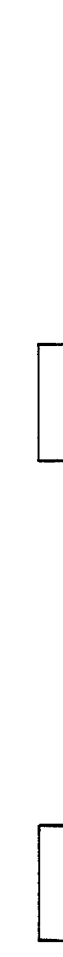
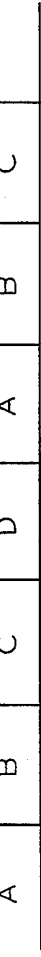
FIG. 13A SYNC SIGNAL
FIG. 13B WRITE SIGNAL
FIG. 13C EXECUTION SIGNAL
FIG. 13D OUTPUT COMMAND SIGNAL
FIG. 13E WRITE SIGNAL
FIG. 13F EXECUTION SIGNAL
FIG. 13G OUTPUT COMMAND SIGNAL
FIG. 13H OUTPUT SIGNAL FIG.17A  SYNC SIGNAL 
FIG.17B  WRITE SIGNAL 
FIG.17C  EXECUTION SIGNAL 
FIG.17D  OUTPUT COMMAND SIGNAL 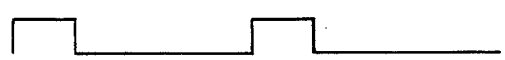
FIG.17E  SYNC SIGNAL 
FIG.17F  WRITE SIGNAL 
FIG.17G  EXCUTION SIGNAL 
FIG.17H  OUTPUT COMMAND SIGNAL 
FIG.17I  OUTPUT OF DELAY 191 
FIG.17J  INPUT OF DELAY 192 
FIG.17K  OUTPUT OF DELAY 193 

REAL TIME PROCESSOR FOR VIDEO SIGNALS

This application is a continuation of application Ser. No. 135,528, filed Dec. 17, 1987, now abandoned, which is a continuation of Ser. No. 756,027, filed July 17, 1985, now abandoned.

BACKGROUND OF THE INVENTION

The present invention relates to a real time signal processor for applying such digital signal processing techniques as digital filtering or high efficiency encoding to television signals and other video signals and, more particularly, to a processor for parallel processing of a frame of video signals with a plurality of unit processors.

Advantages of real time digital signal processing (DSP) include that it makes possible a filter or a modulator/demodulator with such a high degree of precision or stability as is impossible with analog techniques and that it lends itself to ready actualization of a time variant-adaptive filter and the like which is unthinkable with analog signal processing. Further by utilizing the attainments in digital LSI (large scale integration) technology which is now quickly advancing, it is made possible to reduce both the size and power consumption of real time DSP circuits, resulting in steady progress of the digital substitution for analog circuits and the application of such circuits to functionally more sophisticated purposes.

For all its remarkable advantages, DSP has its own disadvantage of requiring an enormous amount of arithmetic operations. For real time signal processing, a given digital signal has to be processed within the sampling period. For example if telephone speech (sampled at 8 kHz) is to undergo fourth-order recursive digital filtering, there will be required eight multiplications and eight additions in 125 microseconds. Therefore, processing of video signals, such as television signals, which are at least 1,000 times as wide in frequency range as and therefore have a sampling period of 1/1000 or even less of that of telephone speech signals, needs a circuit operable at least 1,000 times as fast as one for processing telephone speech signals.

For this reason, sophisticated DSP is at present limited to signals in the audio region, and video signals permit DSP only at a very simple stage.

In digital processing of audio signals, various parameters are altered or the signal processing algorithm is partially modified to achieve high speed DSP. Consequently, there is a strong demand for signal processors permitting alteration of the algorithm or parameters with software. Known instances of hardware achieving DSP with software include a signal processor described in the IEEE Journal of Solid-State Circuits, Vol. SC-16, No. 4, August 1981, pp. 372–376 (Reference 1). Among typical applications of this signal processor is a 32 kbps (kilobits per second) ADPCM coder described in the Proceedings of International Conference on Acoustics Speech of Signal Processing, published by the IEEE in 1982, pp. 960–963 (Reference 2), which is also intended for the processing of telephone speech.

The operating speed of a processor of this type cannot be readily increased by 1,000 times or more however fast its arithmetic circuit may be. Hence there is a zealous call for a software-controlled processor capable of real time DSP of video signals as sophisticated as of audio signals.

Meanwhile, for the real time processing of static pictures, instead of moving pictures, a parallel image processor is disclosed in the Japanese Patent Disclosure No. 53964/1984, which was laid open to public inspection by the Japanese Patent Office on Mar. 28, 1984. This parallel image processor basically comprises a plurality of processor modules, each consisting of a local memory and a local processor, and a supervisory processor connected by a bus to the processor modules and intended to control and supervise the processor modules. In processing a given frame, the supervisory processor supplies each processor module via the bus with video data in each of the blocks into which the frame is divided in a lattice pattern, and each processor module stores in its local memory a predesignated block and adjoining blocks, and processes the data stored into the local memory. The processed data are returned to the supervisory processor from each processor module via the bus.

In this parallel image processor, each processor module uses the data of not only the block to be processed but also the adjoining blocks, and therefore requires no communication with other processor modules in its video processing operation. Each processor module accordingly is able to accomplish convolution or correlation operation independently and highly accurately.

Yet, real time processing of video signals is difficult even for this parallel image processor. In the parallel image processor, too, once a video signal is written into the memory of its supervisory processor, and then read out for transfer to the individual processor modules The data processed by the processor modules are again transferred to the memory of the supervisory processor, and a processed video signal is obtained by reading the data out of this memory, resulting in an extremely long delay time, which makes real time operation difficult.

SUMMARY OF THE INVENTION

A first object of the present invention is, therefore, to provide a real time video signal processor for separate processing of video signals with a plurality of unit processors.

A second object of the invention is to provide a real time video signal processor capable of subjecting video signals, such as television signals, to sophisticated digital signal processing (DSP).

A third object of the invention is to provide a real time video signal processor capable of taking in video signals directly from an input bus without needing another kind of processor, and supplying processed video signals directly to an output bus without needing another kind of processor.

A fourth object of the invention is to provide a real time video signal processor capable of executing convolution or the like without needing communication among its unit processors and without affecting DSP in the peripheral area adjoining the picture block for which each unit processor is responsible.

A fifth object of the invention is to provide a real time video signal processor permitting ready connection of a large number of unit processors therein.

A sixth object of the invention is to provide a real time video signal processor capable of executing fast Fourier transform (FFT) or the like without needing communication among its unit processors and without affecting DSP in the peripheral area adjoining the picture block for which each unit processor is responsible.

A seventh object of the invention is to provide a real time video signal processor capable of achieving real time processing, including motion-compensation interframe encoding or the like, by having each of its unit processors supply two kinds of signals and feeding back one of the two kinds to the input side of each unit processor.

An eighth object of the invention is to provide a real time video signal processor capable of readily altering the mode of signal processing.

According to one aspect of the invention, the real time video signal processor comprises:

a plurality of unit processors, each comprising an input section responsive to a first position signal indicating a position of a block video signal in an input frame of video signals for storing the block video signal, said first position signal being set to be allowed to overlap other first position signal, a processing section for processing the block video signal stored in the input section to produce a processed block video signal, an output section for storing the processed block video signal and outputting the processed block video signal in response to a second position signal indicative of the processed block video signal in an output frame of video signals; and control means for supplying, in response to a synchronization signal indicating the start of the input frame, the first and second position signals to each of the unit signal processors.

The control means may be either decentralized or centralized. Decentralized type control means would consist of a plurality of control sections, one provided for each of the unit processors, and each control section would generate, on the basis of the synchronization signal, the first and second position signals for the unit processor it serves. Centralized type control means would consist of a common control system provided for the plurality of unit processors, and this control system would generate the first and second position signals required by each unit processor, and supply them to the input and output sections A preferred embodiment of the present invention may have for the processing section of each unit processor, in addition to the basic structure described above, either a structure involving a unit signal processor with a program for instructing the mode of signal processing, or a structure involving a unit signal processor for processing the picture block in accordance with a command supplied from outside In the latter case, there will be provided a command generator for repeatedly generating a sequence of commands to determine the processing mode of the unit signal processors in synchronization with the beginning of each frame of video signals and supplying this sequence to each unit signal processor.

If the processing mode is what requires no overlapping in output block video signals, such as convolution or correlation operation, the second position signal supplied to the unit processors will be so set as to avoid overlapping between the unit processors. However, if overlapping is required between output block video signals as in FFT, each of the second position signals supplied to the unit processors will be so set as to permit overlapping with other second position signals, and adding means will be connected to the output bus to add all the outputs of the unit processors There may also be used delay circuits so that a greater number of unit processors can be connected.

BRIEF DESCRIPTION OF THE DRAWINGS

The above and other objects, features and advantages of the present invention will become apparent from the following detailed description when taken with the accompanying drawings

FIGS. 3A to 3H are timing charts for describing the operation of the processor illustrated in FIG. 2;

FIG. 8 is a block diagram of a second embodiment of the invention;

FIGS. 9A to 9I timing charts for describing the operation of the processor illustrated in FIG. 8;

FIGS. 13A to 13H are timing charts for describing the operation of the processor illustrated in FIG. 12;

FIGS. 17A to 17K and FIGS. 19A to 19H are timing charts for describing the operation of the processor illustrated in FIGS. 16 and 18;

The same reference numerals represent the same structural elements.

DETAILED DESCRIPTION OF PREFERRED EMBODIMENTS

The principle of the invention will be described first. If video signals are treated as one-dimensional signals which are suitable for transmission, they will have to be sampled at about 10 MHz as mentioned earlier, and in this case each sample will have to be processed within a period of about 100 nsec. However, if they are treated as frames, which are two-dimensional signals, only 30 frames are transmitted per second in the case of television signals for example. In other words, if a frame can be processed in 33 milliseconds, the real time processing can be retained though there will be a one-frame delay.

For the processing of a frame of sampled signals, the present invention has a plurality of unit signal processors, the area to be processed by each processor being assigned in advance, and each processor selectively stores a block of video signals assigned to it. In this case, the block (hereinafter called the input picture block) is generally greater than what is processed (hereinafter called the processed picture block). Suppose, for instance, $x(i, j)$, which is a two-dimensional sampled signal having coordinates of $(i, j)$, is subjected to a filter having an impulse response of $\{h(i, j)\}$. Here the output y (i, j) is defined as follows, wherein a picture block O and the impulse response h (i, j) being to an area P.

$$O = \{(i, j): -N \leq i \leq N, -N \leq j \leq N\} \quad (1)$$

$$P = \{(i, j): -M \leq i \leq M, -M \leq j \leq M\}$$

Filtering then conforms to the following equation:

$$y(i,j) = \sum_{\substack{(k,l) \\ EP}} h(k,l) \times (i-k, j-l) \quad (2)$$

Therefore, the area Q of the input signal $\{x (i, j)\}$ needed to provide the output frame O, on the basis of Equations (1) and (2), is given by the following equation:

$$Q = \{(i, j): -(M+N) \leq i \leq (M+N) \quad (3)$$
$$-(M+N) \leq j \leq (M+N)\}$$

Figure 1:
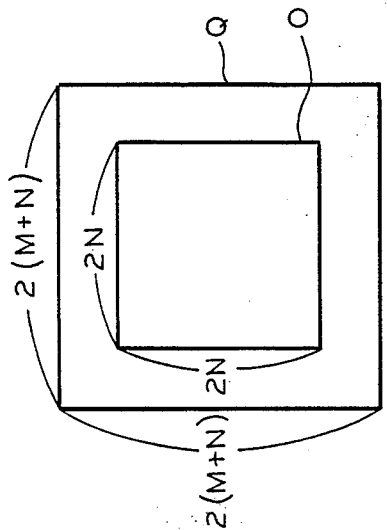
FIG. 1 illustrates the relationship between a data input area Q and a processing area O.

FIG. 1 shows the relationship between an input picture block Q and a processed picture block O, which are squares respectively having sides of 2(M+N) and 2N each.

Whereas Equation (2) represents convolution, correlation operation can also be represented by an equation similar to Equation (2), so that the relationship between input and processed picture blocks can be illustrated as in FIG. 1.

As so far described, although the input and the processed picture blocks differ from each other in convolution or correlation operation, which are basic operations in DSP, information on the whole frame will not be required if the area of the input picture block is fixed. Therefore, if a frame is divided into a plurality of blocks, a plurality of unit signal processors are assigned, one for processing each block, and each processor stores the signals it needs for the processing of the input block assigned to it, then signal processing can be achieved by the individual processors independent of one another. Thus each unit processor will have only to process the block assigned to it in 33 milliseconds, the aforementioned sampling period per frame, and real time video signal processing can be achieved by operating many processors in parallel, whose combined processing capacity would be large enough even though the capacity of each individual processor is sufficient only for the real time processing of audio signals.

Figure 2:
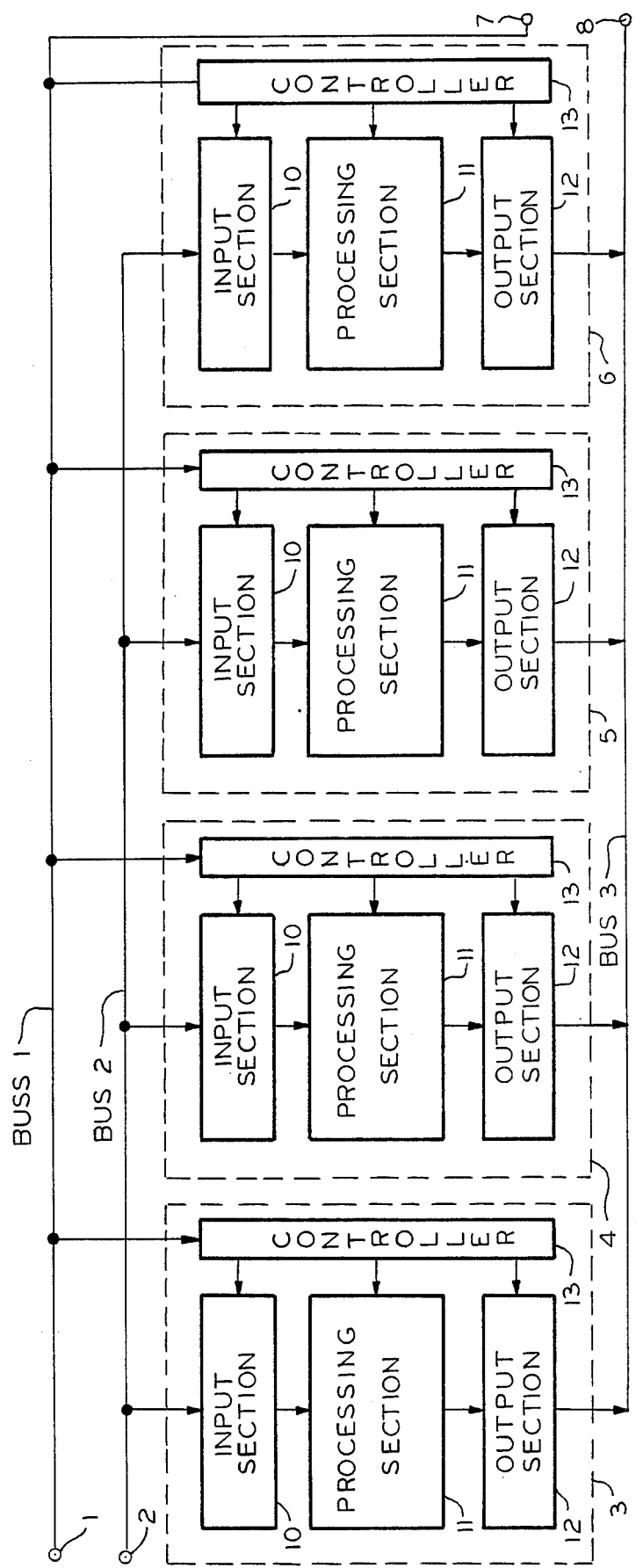
FIG. 2 is a block diagram of a first embodiment of the invention.

Referring to FIG. 2, a first embodiment of the invention comprises a synchronization (sync) signal bus BUS1 connected to a sync signal input terminal 1 and a sync signal output terminal 7; a video signal bus BUS2 connected to a video signal input terminal 2; unit signal processors 3, 4, 5 and 6, and an output bus BUS3 connected to a video signal output terminal 8. Each of the processors 3, 4, 5 and 6 further comprises an input section 10, a processing section 11, an output section 12 and a controller 13. Details of these sections 10, 11 and 12 and the controller 13 will be described later on.

A sync signal entered from the terminal 1 is supplied to the respective controller 13 of the processors 3, 4, 5 and 6 via the bus BUS1. The controller 13 detects the timing of the input of a video signal belonging to an input picture block in response to the sync signal, and sends the detected timing to the input section 10 as a write signal. The input section 10, responsive to the write signal, stores the video signal fed to the terminal 2.

The controller 13, upon detecting the completion of entry of the input block signal, supplies an execution signal to the processing section 11. The processing section 11 performs a DSP predetermined by the execution signal, for instance convolution of Equation (2) given above, and sends a processed picture block to the output section 12.

The controller 13 further detects the output timing of the processed block based on the sync signal to send an output command signal to the section 12. The section 12 sequentially outputs, in response to the output command signal, the video signal processed by and stored into the processing section 11.

FIGS. 3A to 3H for describing the operation of the real time processor shown in FIG. 2, the video signal is supposed to have undergone scanning line conversion, in which video signals obtained by scanning the whole frame are rearranged on a block-by-block basis.

A sync signal (FIG. 3A) supplied to the terminal 1 indicates the start of a frame. In the processor 3 responsible for the first picture block, a write signal (FIG. 3B) rises simultaneously with the sync signal, and continues to command writing until the input picture block ends, after which the controller 13 sends an execution signal (FIG. 3C) to the processing section 11. As a result, the processing section 11 has only to perform signal processing from the leading edge of the execution signal till the next leading edge of the write signal. The controller 13 also sends an output command signal (FIG. 3D) to the output section 12. This output command signal may as well be regarded as the position signal for the picture block to be processed by the processor 3. As explained with reference to FIG. 1, the input picture block is generally greater than the processed picture block, so that the period during which the write signal is "1" is longer than that during which the output command signal is "1".

The signals shown in FIGS. 3E to 3G are respectively the write signal, execution signal and output command signal for the processor 4, which is responsible for the second picture block. The length of time allowed for the processing section 11 of the processor 4 extends from the leading edge of the signal of FIG. 3E to that of the output command signal, as long as that allowed to the processing section 11 of the processor 3.

Whereas the operation only for the processors 3 and 4 have so far been described, basically the same applies to the processors 5 and 6. Since each processor gives its output only while its output command signal is "1", processed video signals are outputted from the terminal 8 of FIG. 2 via the bus BUS3 in the form illustrated in FIG. 3H. It is to be noted, however, that the parts marked A, B, C and D in FIG. 3H represent the outputs of the signal processors 3, 4, 5 and 6, respectively. Therefore, processed video signals are outputted without interruption from the terminal 8.

Although the execution signal is generated at the trailing edge of the write signal in the foregoing example, the former may be generated within the duration of the latter. Its generation can be altered as desired.

Figure 4:
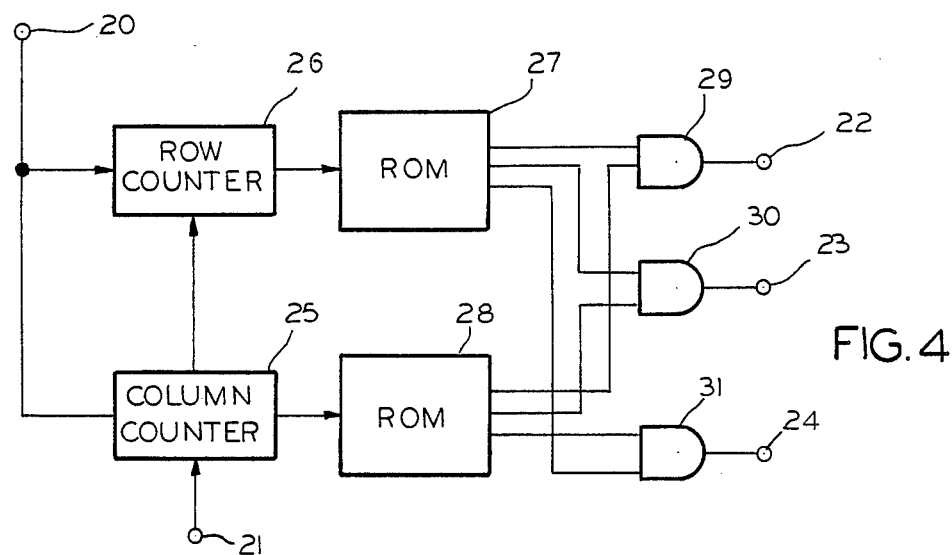
FIGS. 4 to 7 show parts of the first embodiment shown in FIG. 2.

Referring to FIG. 4, the controller 13 comprises a sync signal input terminal 20, a clock signal input terminal 21, a write signal output terminal 22, an execution signal output terminal 23, an output command signal output terminal 24, a column counter 25, a row counter 26, read-only memories (ROMs) 27 and 28, and gate circuits 29, 30 and 31.

The ROM 27 gives a three-bit output, of which the first bit is so programmed as to output "1" for an input address identical with the row number of the input frame and "0" for everything else; the second is so programmed as to output "1" for an input address identical with the row number of the frame at the point of time when an execution command is desired to be outputted and "0" for everything else; and the third is so programmed as to output "1" for an input address identical with the row number of an output frame and "0" for everything else.

The ROM 28 similarly gives a three-bit output, of which the first bit is so programmed as to output "1" for an input address identical with the column number of the input frame and "0" for everything else; the second is so programmed as to output "1" for an input address identical with the column number of the frame at the point of time when an execution command is desired to be outputted and "0" for everything else; and the third is so programmed as to output "1" for an input address identical with the column number of the output frame and "0" for everything else.

When a sync signal is entered from the terminal 20, the column and row counters 25 and 26 are reset, both outputting zero. To take up now, as an example, the controller 13 of the processor 3, the ROM 28 produces, in response to a "0" of the column counter 25, "1" for the first and third bits, respectively representing the input and output frames, and "0" for the second bit. On the other hand, the ROM 27 produces, in response to a "0" of the row counter 26, "1" for the first and third bits, respectively representing the input and output frames, and "0" for the second bit. As a result, the gates 29, 30 and 31 respectively output "1" to the terminal 22, "0" to the terminal 23 and "1" to the terminal 24.

Every time a sampled video signal is fed to the terminal 2 in FIG. 2, a clock signal is supplied to the terminal 21 of FIG. 4 to advance the column counter 25, which, upon completion of a column in a whole frame, advances the row counter 26 by one and returns to zero. The first bit of each of the ROM's 28 and 27 keeps "1" as long as the column and row counters 25 and 26 indicate a column and a row, respectively, belonging to the input frame, and the gate 29 therefore supplies "1" to the terminal 22 for the video signal belonging to the input frame.

Similarly, only when the column and row counters 25 and 26 indicate the start of processing, the ROMs 28 and 27 produce "1" for the second bit, and then the gate 30 supplies "1" as execution signal to the terminal 23.

Similarly, when the column and row counter 25 and 26 indicate a column and a row, respectively, corresponding to the output frame, the ROMs 28 and 27 produce "1", and as a result the gate 31 supplies "1" as output command signal to the terminal 24.

Although ROMs are used in each controller of the embodiment described above, they may as well be replaced with random access memories (RAMs) or the like so that the predetermined positions of the input picture block and the processed picture block can be dynamically varied.

Figure 5:
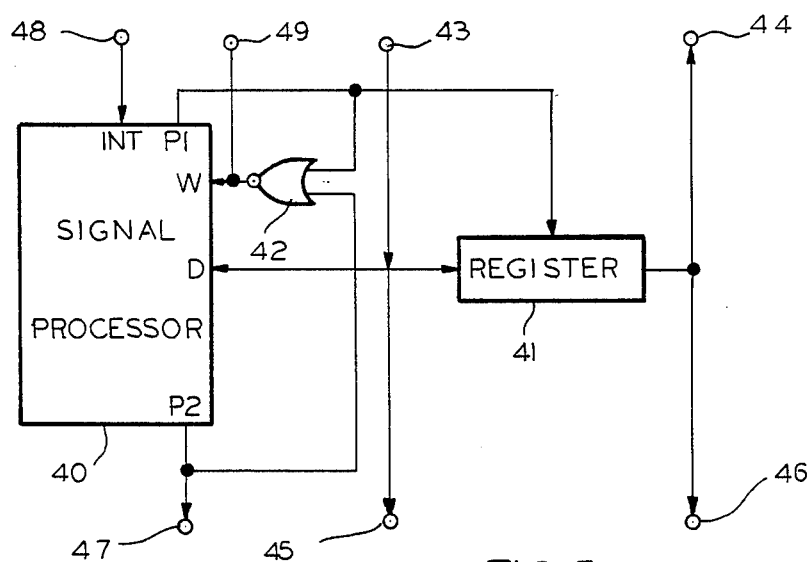

Referring to FIG. 5 the processing section 11 comprises a signal processor 40, a register 41, a gate 42, terminals 43 and 45 connected to the input section 10, terminals 45, 46 and 47 connected to the output section 12, an execution signal input terminal 48 and an output terminal 49 for a read signal to the input section 10. A μPD7720 (Registered Trademark by NEC Corporation) processor of NEC's make, referred to in Reference 1 mentioned above, is supposed to be used as the signal processor 40. For details on μPD7720, which is a signal processor of a unique bus structure having a multiplier and an adder built into it, see said Reference 1. μPD7720 is so designed as to execute interruption, as prescribed by a program stored in advance into a built-in ROM, and has programmable output bits P1 and P2. It achieves inputting and outputting by way of a bidirectional parallel bus (D), which is used in the inputting direction when a signal is coming to a write terminal (W) or in the outputting direction if no signal is coming to the write terminal (W).

Now, as the execution signal from the controller 13 FIG. 2 is fed to the terminal 48 of FIG. 5, the processor 40 begins signal processing as an interruption process. For this purpose, it requires input data from the input section 10 of FIG. 2, prepares a required address at port D, and outputs "1" from the port P1. At this time the gate 42 outputs "0", and the address at port D can be stored in the register 41. Then, when the output from the port P1 turns "0", the address of the register 41 is sent to the input section 10 via the terminal 44, and the corresponding data are entered into port D from the terminal 43.

Similarly, to transfer the data processed by the processor 40 into the output section 12, the required address is prepared in port D, and "1" is supplied from the port P1 to write the address into the register 41. This address is sent to the output section 12 via the terminal 46. Next, the processed data are prepared in port D, and "1" is supplied from the bit output port P2. At this time, since the gate 42 produces "0" to inform the input section 10, via the output terminal 49, of the inhibition of outputting, the data on port D are sent to the output section 12 via the terminal 45. Further, "1" at the port P2 is conveyed to the output section 12 via the terminal 47 to command writing of the data sent from the terminal 45 into the output section 12.

Figure 6:
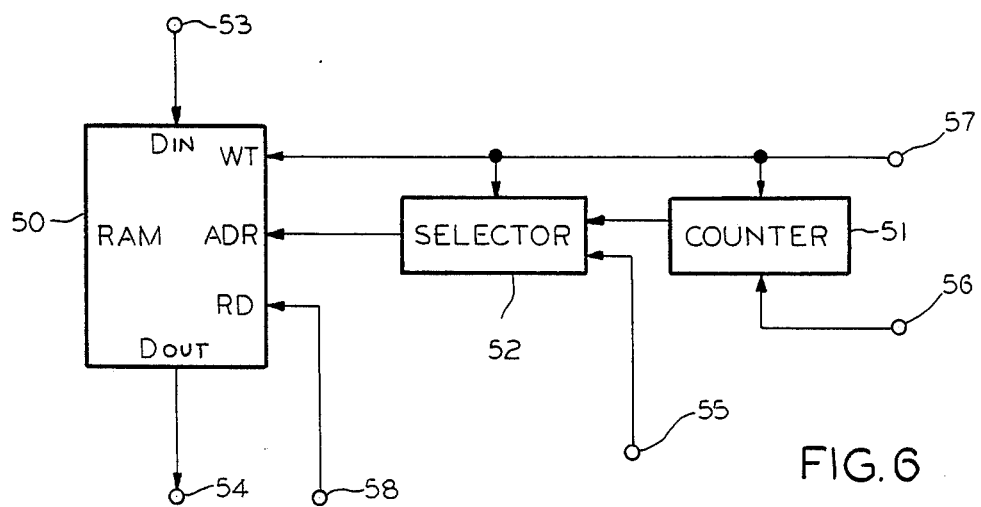

Referring to FIG. 6, the input section 10 has a RAM 50, a counter 51, a selector 52, a video signal input terminal 53, an output terminal 54, an address input terminal 55, a sync signal input terminal 56, a write signal input terminal 57 and a read signal input terminal 58. Here, data on a terminal $D_{in}$ is written into an address of the RAM 50 when "1" is inputted to a terminal WT, or output data are read out of an address of the RAM 50 when "1" is inputted to a terminal RD. Further, when "0" is inputted to the terminal RD, the impedance at the terminal $D_{out}$ rises to a high level.

As long as "1" is supplied from the controller 13 to the terminal 57, the selector 52 selects as address the output of the counter 51, and every time a sampled video signal is fed to the terminal 2 of FIG. 2, the counter 51 is advanced by one after the video signal at the terminal 53 is written into the RAM 50. Every time a sync signal is fed to the terminal 56, the counter 51 is reset to zero. Therefore, video signals of the input picture block are written into the RAM 50 in the order of their entry.

Meanwhile, as long as "0" is supplied from the controller 13 to the terminal 57, the selector 52 is switched, and the RAM 50 is accessed in response to an address supplied from the processing section 11 to the terminal 55. Data are read out of the RAM 50 to the output terminal 54 by feeding "1" from the terminal 49 (FIG. 5) to the terminal 53.

Figure 7:
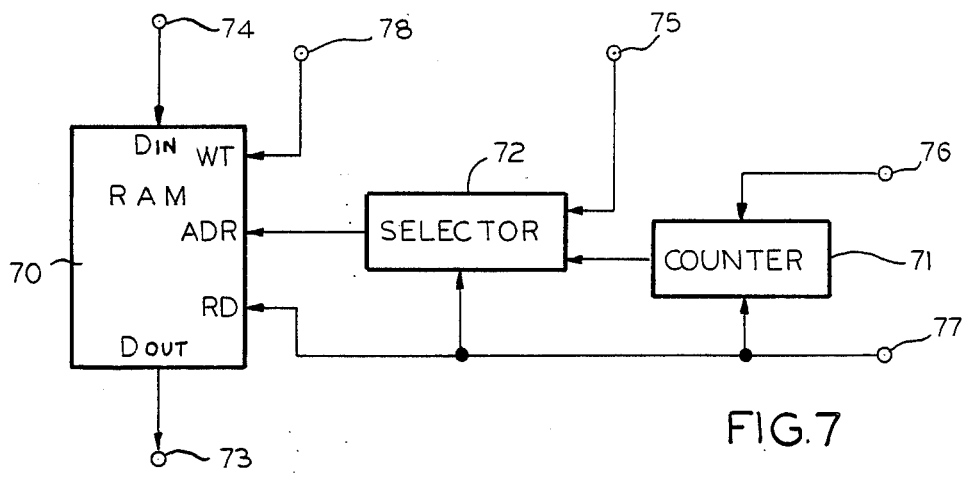

Referring to FIG. 7, the output section 12 is made up of RAM 70, a counter 71, a selector 72, an output terminal 73, an input terminal 74, an address input terminal 75, a sync signal input terminal 76, an output command signal input terminal 77 and a write signal input terminal 58. Here, the RAM 70 has the same functions as the RAM 50 shown in FIG. 6.

As long as "0" is supplied from the controller 13 to the terminal 77, the selector 72 is switched to the terminal 75, and the RAM 70 is accessed in response to an address supplied from the processing section 11 to the terminal 75. Data on the input terminal 74 are written into the RAM 70 by feeding "1" from the terminal 47 to the terminal 78 of FIG. 7 after the address is stored in the register 41 of FIG. 5.

Meanwhile, as long as "1" is supplied from the controller 13 to the terminal 77, the selector 72 selects as address the output of the counter 71, and every time a sampled video signal is fed to the terminal 2 of FIG. 2, the counter 71 is advanced by one after data are read out of an address in the RAM 70 to the output terminal 77. Every time a sync signal is fed to the sync signal input terminal 76, the counter 71 is reset to zero. Therefore, data processed by the processing section 11 block by block are read out of the RAM 70 in the order of their addresses.

Second Embodiment

Whereas the input picture block is greater than the processed picture block for the first embodiment, this second embodiment applies where the input picture block is identical in dimensions with the processed picture block.

One example of identity between the input picture block and the processed picture block is DSP using Fourier transform. There is a technique known as fast FFT for high-speed Fourier transform by DSP. The FFT transforms time domain signals into frequency domain signals. After they are processed in the frequency domain, the processed signals are transformed into time domain signals by inverse fast Fouriet transform (IFFT).

FFT in M×M regions usually follows the following equation:

$$x(i,l) = \sum_{k=0}^{M-1} \sum_{l=0}^{M-1} \hat{x}(k,l) \cdot \exp(\sqrt{-1} \cdot 2\pi ik/N) \cdot \exp(\sqrt{-1} \cdot 2\pi jl/N) \quad (4)$$

wherein $\hat{x}(k, l)$ derives from the multiplication of an input signal $x(k, l)$ by a window function $w(k, l)$, such as the Hamming window, as represented by the equation below:

$$\hat{x}(k, l) = w(k, l) \cdot x(k, l) \quad (5)$$

Since the value of this window function decreases toward the border zone of the M×M region, usually signals are subjected to FFT with an overlap of M×M/2 on each of the four sides, processed in the frequency domain, and returned to the time domain by IFFT, the mutually overlapped being added to another. In other words, the usual way of FFT is to enter signals in an overlapped form and to add the output results of the overlapped parts.

When such a way of DSP is adapted to video signals, they are taken in by unit signal processeor with overlaps among them, and after that DSP is performed by the individual unit signal processors independently of one another. The result of processing by each processor is provided as much overlapped with those of other processors as the input picture blocks are overlapped. Normal data can be obtained by adding all these overlapped processing results.

Now turning to FIG. 8, a second embodiment differs from the first embodiment of FIG. 2 in that the output command signal supplied from the controller 13 partly overlaps output command signals supplied from other controller 13, and in that adders 91 through 93 are connected to the bus BUS3 so that all the outputs of the processors 3 through 6 can be added. The output section 12, in response to the output command signal, sequentially reads out the data processed and written in by the processing section 11 when the output command signal is on, or outputs zero when that signal is off. Output signals from all the output sections 12 are added by the adders 91, 92 and 93.

Referring to FIGS. 9A to 9I, the operation of the processor shown in FIG. 8 will be described. The video signal is supposed to have undergone a scanning line conversion as described with respect to FIG. 2. A sync signal (FIG. 9A) supplied to the terminal 1 of FIG. 8 indicates the beginning of a frame. In the first processor 3 responsible for the first picture block, a write signal (FIG. 9B) generated by the controller 13 rises simultaneously with the sync signal, and continues to command writing until the picture block ends. After the writing ends, the controller 13 gives an execution signal (FIG. 9C) to the processing section 11. The processing section 11 performs signal processing from the leading edge of the execution signal till the next leading edge of the write signal. The controller 13 also sends an output command signal (FIG. 9D) to the output section 12. While this output command signal is the same as the write signal in the application of FFT or the like, the former may be shorter in duration than the latter in the application of convolution or the like, where the input picture block is greater than the processed picture block as shown in FIG. 1.

Signals shown in FIGS. 9E to 9G are respectively the write signal, execution signal and output command signal for the processor 4 responsible for the second picture block. The length of processing time allowed to the processing section 11 of the processor 4 is from the leading edge of the execution signal (FIG. 9F) till that of the output command signal (FIG. 9G) equal to the period allowed to the processing section 11 of the processor 3.

Whereas the control signals only for the processors 3 and 4 have so far been described, basically the same applies to the processors 5 and 6. Since each processor gives its output only while its output command signal is "1", the timing of the addition of non-zero output of the two processors by one of the adders 91, 92 and 93 is as illustrated in FIG. 9H. The sections marked with A, B and C in FIG. 9H are the periods during which the adders 91, 92 and 93 are adding. These additions are necessary for FFT processing. As a result, video signals shown in FIG. 9I are provided at the output terminal 8 of FIG. 8. In FIG. 9H, the reference character $V^i$ represents the output of the ith unit signal processor, and $V^{i+j}$, the sum of the outputs of the ith and jth processors. Therefore, at the output terminal 8 are consecutively provided video signals, making possible real time signal processing.

Figure 10:
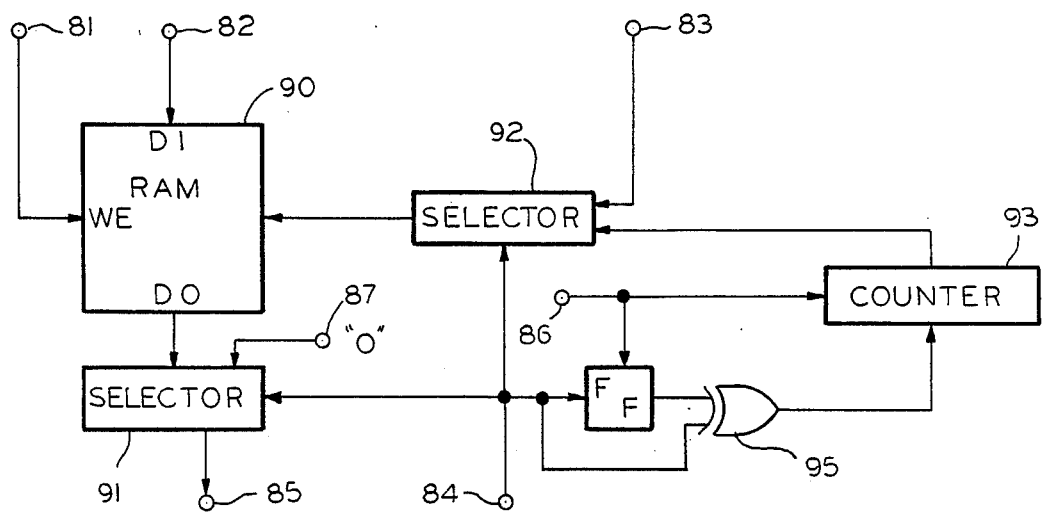
FIG. 10 is a block diagram of the output section 12 used in FIG. 9.

Referring to FIG. 10, the output section 12 used in the second embodiment of FIG. 8 contains a write signal input terminal 81, a data input terminal 82, an address input terminal 83, an output command signal input terminal 84, an output terminal 85, a clock input terminal 86, a zero input terminal 87, a RAM 90, selectors 91 and 92, a counter 93, a flipflop 94 and a gate 95.

When "0" of the output command signal supplied from the terminal 24 in FIG. 4 is fed to the terminal 84 of FIG. 10, the command signal controls the selector 91 to select zero entered from the terminal 87. At the same time, since the processing section 11 shown in FIG. 5 is engaged in DSP upon "0" of the output command signal, the selector 92 is so controlled as to send data from the terminal 83 to the RAM 90. At this time, the processed data given to the terminal 82 are written into an address determined by the signal at the terminal 83 of FIG. 10 in response to the write signal at the terminal 81.

When the output command signal supplied to the terminal 84 is turned to "1", the selectors 81 and 82 select the RAM 90 and the counter 93, respectively. The gate detects the change in the state based on "0" stored in the flipflop 94 and "1" of the current state. The output of the gate 95 resets the counter 93 at "0".

As a result, the "0" of the counter 93 is supplied to the RAM 90 as an address via the selector 92, and the content at address "0" in the RAM 90 is supplied to the terminal 85 via the selector 91.

Since the output command signal supplied to the terminal 84 remains "1", the values of both the flipflop 94 and the terminal 84 turn "1", so that the counter 93 is not reset thereafter, but advances by one at every sampling time. The content of the counter 93 is used as the address of the RAM 90 via the selector 92, with the result that the data at the corresponding addresses are supplied to the terminal 85 via the selector 90.

Third Embodiment

Figure 11:
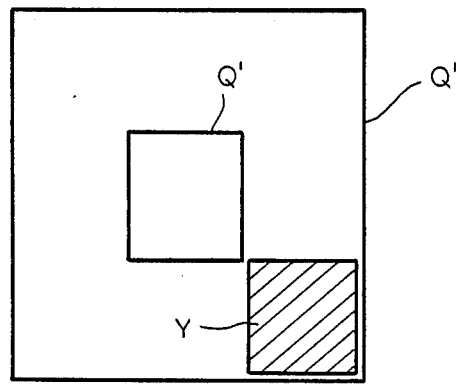
FIG. 11 illustrates the relationship between an encoding area O' and a decoding area Q'.

Important applications of video signal processing include the high-efficiency encoding technique by which the efficiency of transmission line can be improved. A typical example is the motion-compensation interframe encoding system described in CS81-87, the communication system study group's papers (in Japanese), published by the Institute of Electronics and Communication Engineers (IECE) of Japan on July 22, 1981. The basic principle of this system is to detect the difference between the currently entered sample and the sample one frame before and to encode the difference for transmission. The receiving side reproduces the original video signal by adding the differential video signal decoded from the received signal to the decoded signal one frame before. In motion-compensation interframe encoding, the difference of input picture blocks is taken only for the particular block of the decoded picture block whose position has changed corresponding to the motion. FIG. 11 illustrates this relationship, indicating that a picture block Y whose position has changed with the motion can be prepared by providing a greater decoded picture block Q' than the encoded block O'.

Whereas it also is conceivable to filter, prior to encoding, the input picture block by the use of Equation (2) given earlier, in this case, too, the input picture block requires a greater block Q' than the encoding block O', like in the O-Q relationship shown in FIG. 1.

Figure 12:
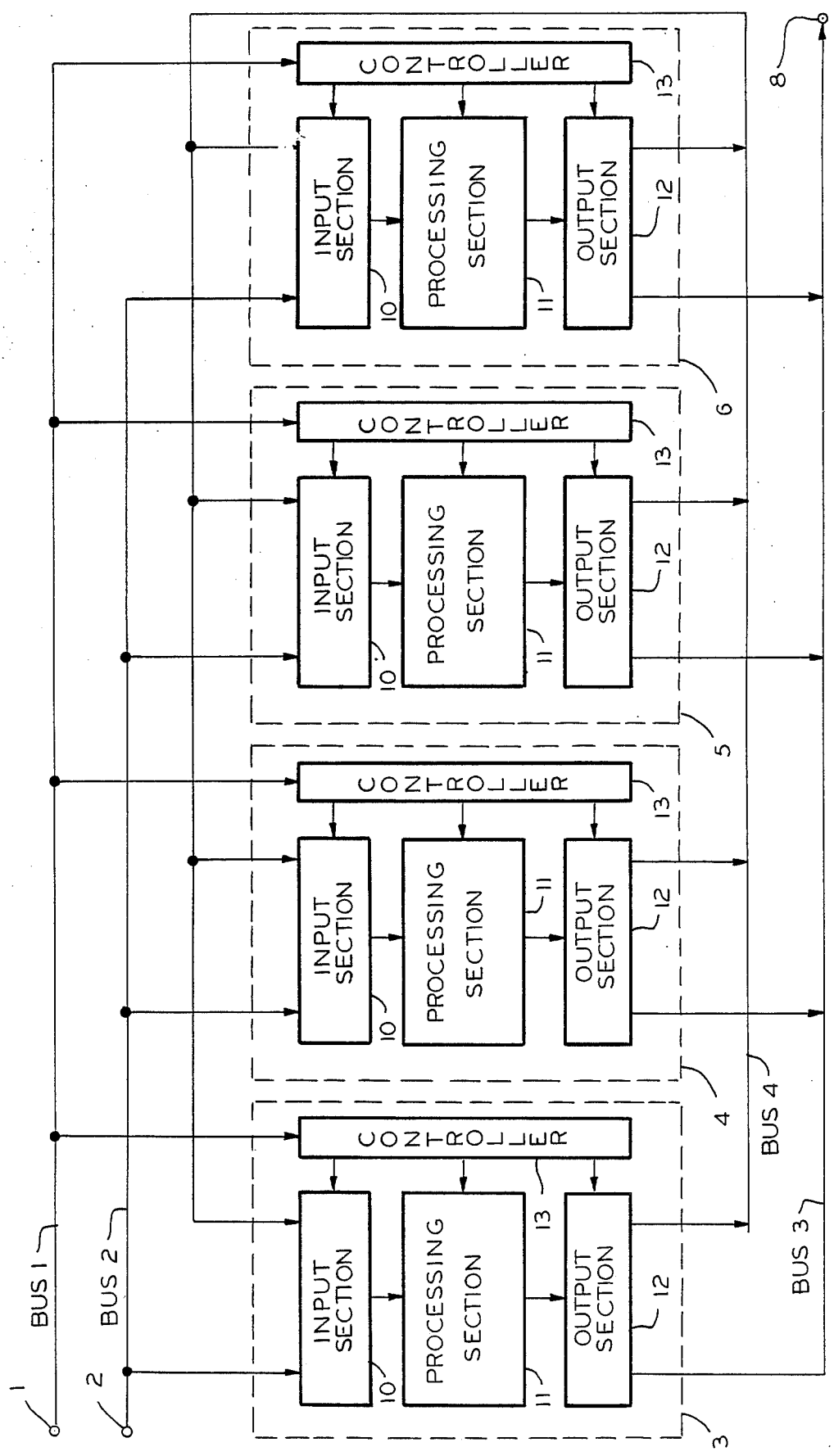
FIG. 12 is a block diagram of a third embodiment of the invention.

Referring to FIG. 12, a third embodiment differs from the first embodiment of FIG. 2 in that each of the input section 10 and the output section 12 has a pair of memories, and in that a locally decoded video signal stored in the output section 12 is fed back to the input section 11.

A sync signal supplied from the bus BUS1 is entered into the controller 13 of each of the processors 3, 4, 5 and 6. The controller 13, in response to the sync signal, detects the timing of the input of a video signal to be written in the input section 10, and sends the detected timing to the input section 10 as a write signal. The input section 10, in response to the write signal takes in and stores an input video signal and a locally decoded video signal conveyed by the bus BUS2 and the bus BUS4, respectively.

The controller 13, upon detection of the completion of the entry of these signal, also sends an execution signal to the processing section 11. The processing section 10 performs differential encoding between the input video signal and the input locally decoded signal and produce a coded video signal and a locally decoded signal which are stored in the output section 12.

The controller 13 further detects the output timing of a predetermined processed picture block in response to the sync signal to give an output command signal to the output section 12 when the processed picture block comes. Upon receipt of the output command signal, the output section sequentially supplies the coded signal to the bus BUS3 and the local decoded signal to the bus BUS4.

Referring to FIGS. 13A to 13H the operation of the processor shown in FIG. 12 will be described in detail. The video signal is supposed to have undergone scanning line conversion as described with respect to FIG. 2. A sync signal (FIG. 13A) supplied to the bus BUS1 indicates the start of a frame. In the processor 3 responsible for the first picture block, a write signal (FIG. 13B) generated by the controller 13 rises simultaneously with the sync signal, and continues to command writing until the input picture block ends, after which the controller 13 also sends an execution signal (FIG. 13C) to the processing section 11. As a result, the processing section 11 performs signal processing from the leading edge of the execution signal till the next leading edge of the next write signal. The controller 13 sends an output command signal (FIG. 13D) to the output section 12. This output command signal may as well be regarded as the position signal for the picture block to be processed by the processor 3. As explained with reference to FIG. 1, since the input picture block is generally greater than the processed block, the period during which the write signal is "1" is longer than that during which the output command signal is "1".

The signals shown in FIGS. 13 (E) to (G) are respectively the write signal, execution signal and output command signal for the processor 4, which is responsible for the second picture block. The relationship between the write signal and the execution signal derives from the difference between the input picture block and the processed picture block, illustrated in FIG. 1. The length of time allowed for the processing section 11 of the processor 4 extends from the leading edge of the execution signal to that of the output command signal, as long as that allowed to the processing section 11 of the processor 3.

Whereas the control signals only for the processors 3 and 4 have been described, basically the same applies to the processors 5 and 6. Since each processor gives its output only while its output command signal is "1", processed coded signals and decoded video signals are outputted to the buses BUS3 and BUS4 of FIG. 12 in the form illustrated in FIG. 13H. It is to be noted, however, that the parts marked A, B, C and D in FIG. 13H represent the output of the processors 3, 4, 5 and 6, respectively. Therefore, processed coded signals and decoded video signals are outputted without interruption to the buses BUS3 and BUS4.

Figure 14:
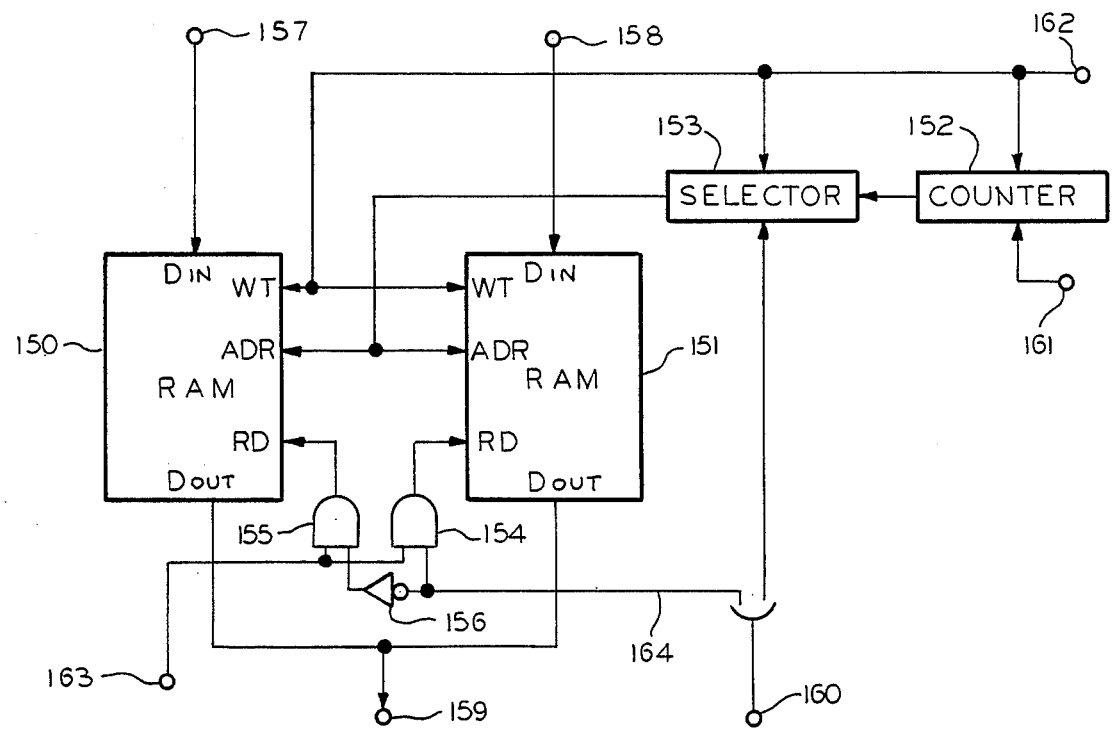
FIGS. 14 and 15 show parts of the second embodiment shown in FIG. 12.

Referring to FIG. 14, the input section 10 used in the third embodiment of FIG. 12 includes two RAM's 150 and 151, a counter 152, a selector 153, gates 154, 155 and 156, a video signal input terminal 157, an auxiliary video signal input terminal 158, an output terminal 159, an address input terminal 160, a sync signal input terminal 161, a write command signal input terminal 162, a read signal input terminal 163, and an address input most significant bit (MSB) signal line 164, wherein the RAM's 150 and 151 have the same function as the RAM 50 in FIG. 6.

As long as "1" is supplied from the controller 13 (FIG. 12) to the terminal 162, the selector 153 selects as address the output of the counter 152. Every time a sampled video signal is fed to the terminal 2 of FIG. 12, the counter 152 is advanced by one after the video signals at the terminals 157 and 158 are written into the same address in the RAM's 150 and 151, respectively. Every time a sync signal is fed to the terminal 161, the counter 152 is reset to zero. Therefore, video signals in the input picture block are written into the RAM's 150 and 151 in the order of their entry.

Meanwhile, as long as "0" is supplied from the controller 13 to the terminal 162, the RAM's 150 and 151 are accessed by an address supplied from the processing section 11 to the terminal 160. Here, the choice between the RAM's 150 and 151 is done by the use of the MSB signal line 164 for the address supplied from the processing section 11 to the terminal 160. Data are read out of either the RAM 150 or the RAM 151 to the terminal 159 by feeding "1" to the terminal 163 of FIG. 14 after the address is stored in the register 41 of FIG. 5.

Figure 15:
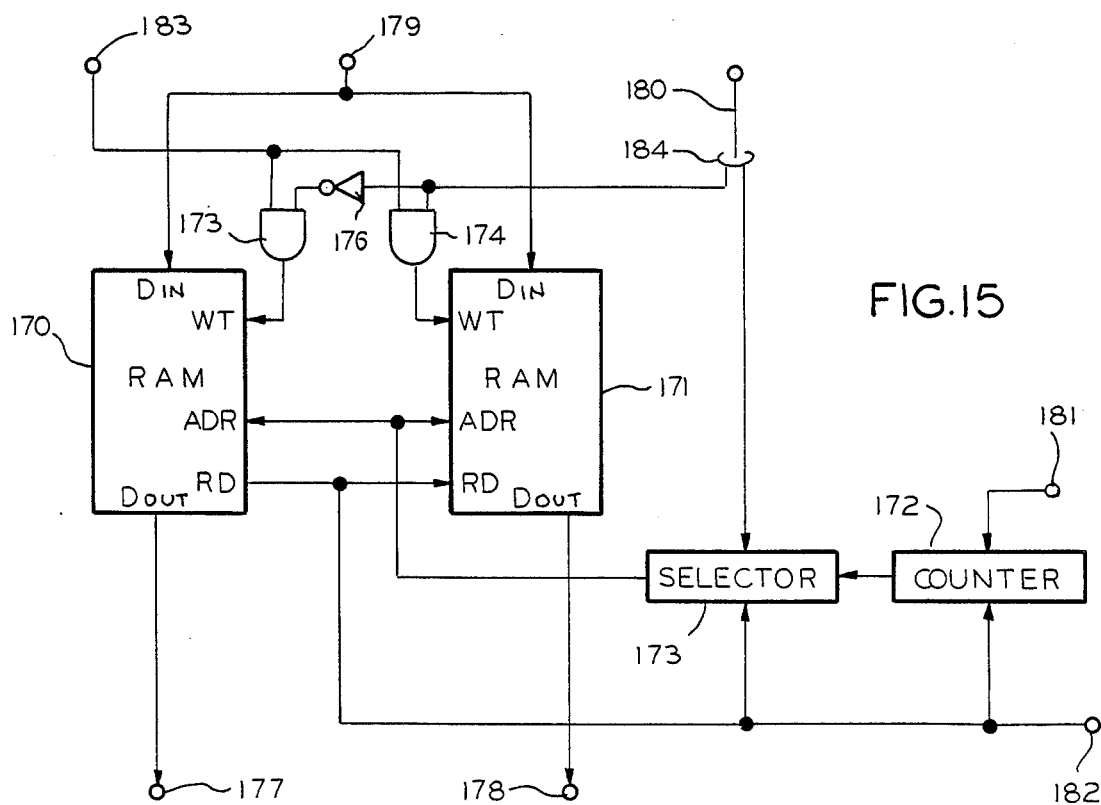

Referring to FIG. 15, the output section 12 for use in the third embodiment of FIG. 12 involves two RAM's 170 and 171, a counter 172, a selector 173, gates 174, 175 and 176, a coded signal output terminal 177, an auxiliary video signal output terminal 178, an input terminal 179, an address input terminal 180, a sync signal input terminal 181, an output command signal input terminal 182, a write signal input terminal 183, and an address input MSB signal line 184, wherein the RAM's 170 an 171 have the same function as the RAM 50 in FIG. 6.

As long as "0" is supplied from the controller 13 to the terminal 182, the RAM's 170 and 171 are accessed by an address supplied from the processing section 11 to the terminal 180. Here, the choice between the RAM's 170 and 171 is done by the use of the MSB signal line 184 for the address supplied from the processing section 11 to the terminal 180. Data at the input terminal 179 are written into either the RAM170 or the RAM 171 by feeding "1" to the terminal 183 of FIG. 15 after the address is stored in the register 41 of FIG. 5.

Meanwhile, as long as "1" is supplied from the controller 13 to the terminal 182, the selector 173 selects as address the output of the counter 172. Every time a sampled video signal is fed to the terminal 2 of FIG. 12, the counter 172 is advanced by one after data are read out of the same address in the RAM's 170 and 171 to the terminals 177 and 178, respectively. Every time a sync signal is fed to the terminal 181, the counter 172 is reset to zero. Therefore, data processed by the processing section 11 block by block are read out of the RAM's 170 and 171 in the order of their addresses.

Though it is supposed in the foregoing description that the input picture block to be taken into the input section 10 via the bus BUS2 and the auxiliary picture block to be taken into the input section 10 via the bus BUS4 are the same in size, setting their respective sizes independently of each other also is within the scope of the present invention. In this instance, the controller 13 would supply two write signals, one for the input picture block and the other for the auxiliary picture block, to the input section 10. A controller to perform such an action can be realized by using fourbit output ROM's as the ROM's 27 and 28 of FIG. 4, making the write signal for the auxiliary picture block with a gate for performing an AND operation between the additional bits, and providing a pair each of the counters 152, the selectors 153 and the write command signal input terminals 162, which are shared by the RAM's 150 and 151 of the structure illustrated in FIG. 14.

Fourth Embodiment

Every one of the foregoing embodiments is a real time video signal processor using four processors. However, the present invention obviously does not limit itself to video signal processors comprising four processors each, but a real time video signal processor according thereto can use any plural number of unit signal processors.

Yet, where a frame is to be processed by a large number of unit signal processors, if all the unit signal processors are arranged in parallel and inputs and outputs are coupled by common buses, data transfers via these buses will require a data transmitting section having a sufficiently large signal driving capacity, which would naturally limit the number of unit signal processors that can be connected. A fourth embodiment will eliminate this limitation as described below.

Figure 16:
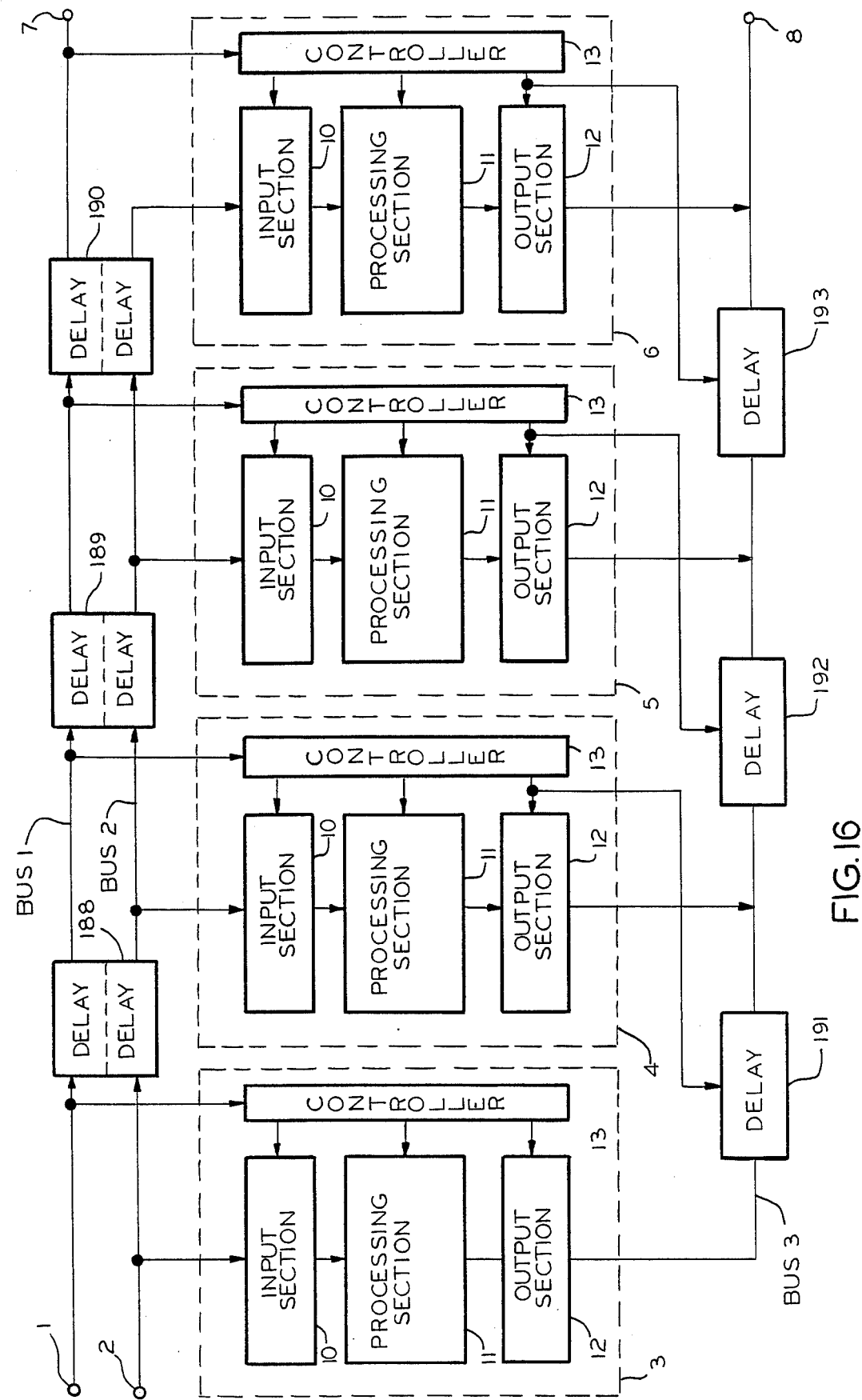
FIGS. 16 and 18 are block diagrams of a fourth and fifth embodiments of the invention.

Referring to FIG. 16, the fourth embodiment is composed of delay circuits 188 to 193, of which 188 to 190 are connected to a sync signal bus BUS1 and a video signal bus BUS2 and 191 to 193, to an output bus BUS3. The input and output sections 10 and 12 have internal memory circuits, and the latter's has a tri-state output (an output that can have a high impedance). Each of the delay circuits 188 to 190 is a pair of registers, one for the control signal and the other for the video signal, each consisting of a D type flipflop for shifting input data to output at every sampling interval. Each of the delay circuits 191 to 193 is a register consisting of a D type flipflop having a tristate output.

A sync signal entered from the terminal 1 is supplied to the controller 13 of the processor 3 and also to the delay circuit 188. The controller 13 detects the timing of the inputting of a signal belonging to an input picture block assigned by the input sync signal, and sends the detected timing to the input section 10as a write signal.

The input section 10, in response to the write signal, takes in and stores the input video signal.

The controller 13, upon detection of the completion of the entry of video signals belonging to an input picture,also sends an execution signal to the processing section 11. Upon receipt of the execution signal, the processing section 11 performs a predetermined mode of DSP, for instance the convolution of Equation (2) referred to above, and sends the results to the output section 12.

The controller 13 further detects the output timing of a processed picture block based on the sync signal, and supply an output command signal to the output section 12 when the processed picture block comes. The output section 12, upon receipt of the output command signal, sequentially outputs processed data.

The sync signal and the video signal supplied to the terminals 1 and 2, respectively, are delayed by the delay circuit 188 by one sampling interval, and then sent to the controller 13 and the input section 10 of the processor 4, so that, thereafter, the controller 13, input section 10, processing section 11 and output section 12 within the unit signal processor 4 perform the same operation as the foregoing, which was done in the unit signal processor 3, on a different picture block.

The processors 5 and 6 also receive through the delay circuits 189 and 190 the sync signal and the video signal, respectively delayed by two and three sampling intervals, and perform the same processing as the processors 3 and 4.

The output from the processor 3 is delayed by the delay circuit 191 by one sampling interval. Since the delay circuit 191 is so designed as to become a high impedance element (tri-state buffer) only when the processor 4 gives its output, the delayed output of the processor 3, with reference to the sync signal similarly delayed by the delay circuit 188, comes exactly to the picture block position for which the processor 3 is responsible. As a result, the output of the processor 3 delayed by the delay circuit 191 continues to be supplied to the delay circuit 192 until the end of the period for which is responsible the sync signal emerging to the delay circuit 188. When the whole output of the signal processor 3 delayed by the delay circuit 191 has been supplied to the delay circuit 192, the output command signal from the controller 13 of the processor 4 makes the delay circuit 191 a high impedance element and begins to supply data from the output section 12. As a result, the delay circuit 192, immediately upon completion of the outputting of the processor 3 via the delay circuit 191, begins to receive the output of the processor 4 as delayed input. The output relationship between the processor 5 and the delay circuit 192 with respect to the sync signal from the delay circuit 188 is similar to that between the processor 4 and the delay circuit 191 with respect to the sync signal from the delay circuit 189, and so is the output relationship between the processor 6 and the delay circuit 192 with respect to the sync signal from the delay circuit 190. Therefore, description of the output relationships of these two signal processors is dispensed with.

Referring to FIGS. 17A to 17K, the operation of the processor shown in FIG. 16 will be explained next. The video signal is supposed to have undergone scanning line conversion as described with respect to FIG. 2. A sync signal (FIG. 17A) supplied to the bus BUS1 marks the start of a frame. In the processor 3 responsible for the first picture block, a write signal (FIG. 17B) generated by the controller 13 rises simultaneously with the sync signal, and continues to command writing until the input picture block ends, after which the controller 13 also sends the execution signal (FIG. 17C) to the processing section 11. As a result, the section 11 performs signal processing from the leading edge of the execution signal till the next leading edge of the write signal. The controller 13 also supplies an output command signal (FIG. 17D) to the output section 12. This output command signal may as well be regarded as the position signal for the picture block to be processed by the processor 3. As explained with reference to FIG. 1, the input picture block is generally greater than the processed picture block, so that, to compare the durations of the write signal and output command signal respectively corresponding to these blocks, the period during which the write signal is on is longer than that during which the output command signal is on.

A signal shown in FIG. 17E is the sync signal passing and delayed by the delay circuit 188.

FIGS. 17F to 17H show respectively the write signal, execution signal and output command signal for the processor 4. The relationship between the write signal and output command signal derives from the difference between the input block and the processed block, illustrated in FIG. 1. The length of time allowed for the processing section 11 of the processor 4 extends from the leading edge of the execution signal to that of the output command signal, as long as that allowed to the processing section 11 of the processor 3.

Whereas the control signals only for the processors 3 and 4 have been described, basically the same applies to the processors 5 and 6. Therefore, at the output terminal 8 of FIG. 16, the output signal of each processor, delayed by four sampling intervals from the sync signal supplied to the terminal 1, is read out without interruption as shown in FIG. 17K, wherein the parts indicated at C and D are the outputs of the processors 5 and 6, respectively.

As hitherto described, the fourth embodiment, in which unit signal processors are separated from one another by delay circuits, can avoid errors due to the deterioration of transmitted signals or the like even if a large number of unit signal processors are used because the sync signal, input and output video signals are retimed for transmission.

Fifth Embodiment

In the first to four embodiments described above, the processing by the processing section is prescribed by a program stored in a signal processor 40 (FIG. 5) of the processing section 11. Therefore, altering the processing would require a modification of the program. However, in this fifth embodiment, the program prescribing the processing has only to be stored in a command generator unit, so that the signal processors need not have large capacities for program storage and, moreover, the processing can be readily altered.

Figure 18:
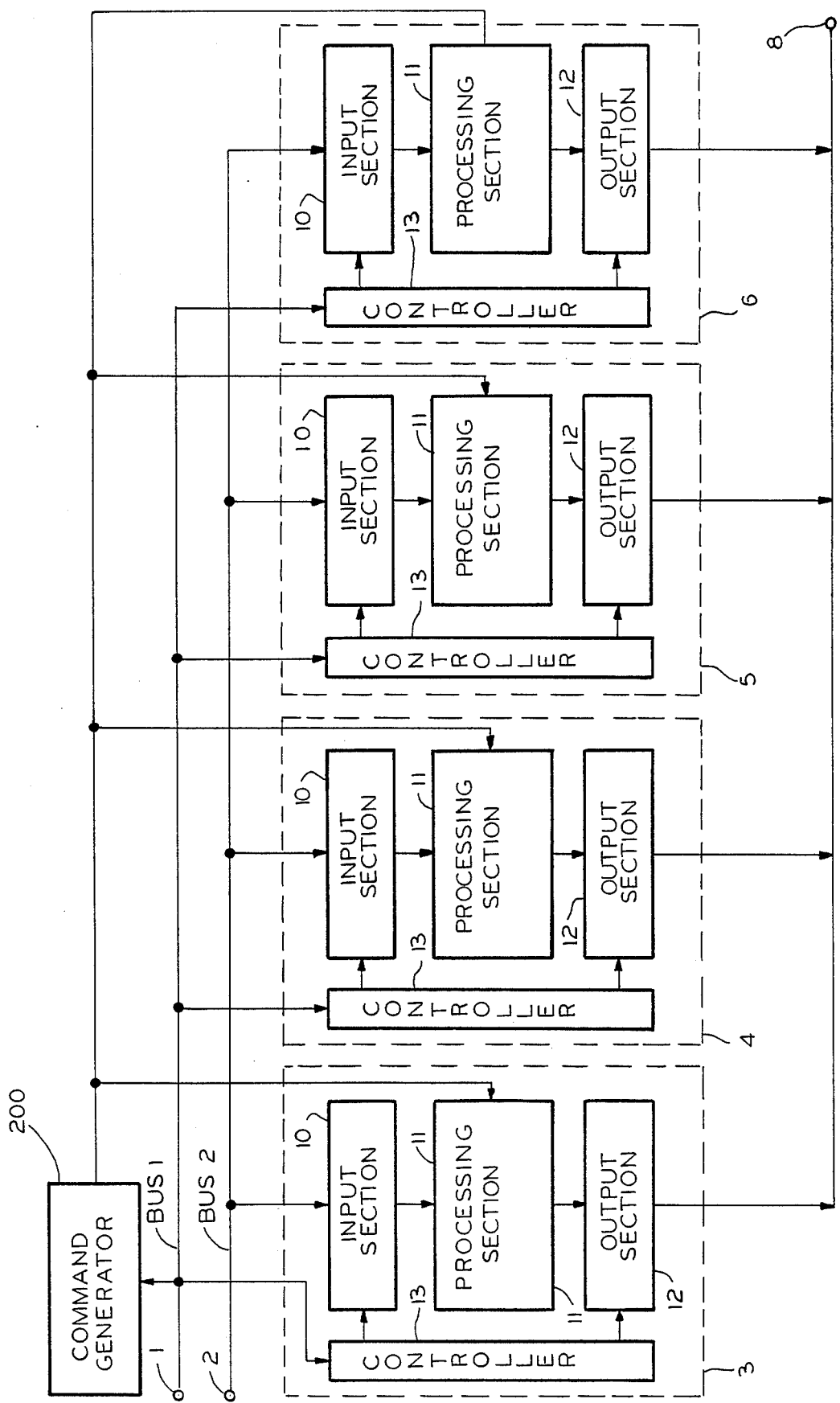

Referring to FIG. 18, the fifth embodiment comprises a sync signal bus BUS1, a video signal bus BUS2, unit signal processors 3, 4, 5 and 6, a command generator 200 and an output bus BUS3 connected to a video signal output terminal 8.

A sync signal entered from the terminal 1 is supplied to the controller 13 of each of the processors 3, 4, 5, and 6 and also to the command generator 200. The controller 13 detects the timing of the inputting of a signal belonging to an input picture block assigned by the input sync signal, and supplies the detected timing to the input section 10 as a write signal. The input section 10, in response to the write signal takes in and stores the input video signal.

The processing section 11 performs a mode of DSP predetermined by a command sequence supplied from the generator 200, for instance the convolution of Equation (2) referred to above, upon an input video signal stored in the input section 10. The operational results are written into the output section 12.

The controller further detects the output timing of a processed picture block predetermined by the sync signal, gives an output command signal to the output section 12 when the processed picture block comes. The output section 12, in response to the output command signal, sequentially outputs processed data.

Referring to FIGS. 19A to 19H, the operation of the processor shown in FIG. 18 will be described. The video signal is supposed to have undergone scanning line conversion as described with respect to FIG. 2.

Figure 19:
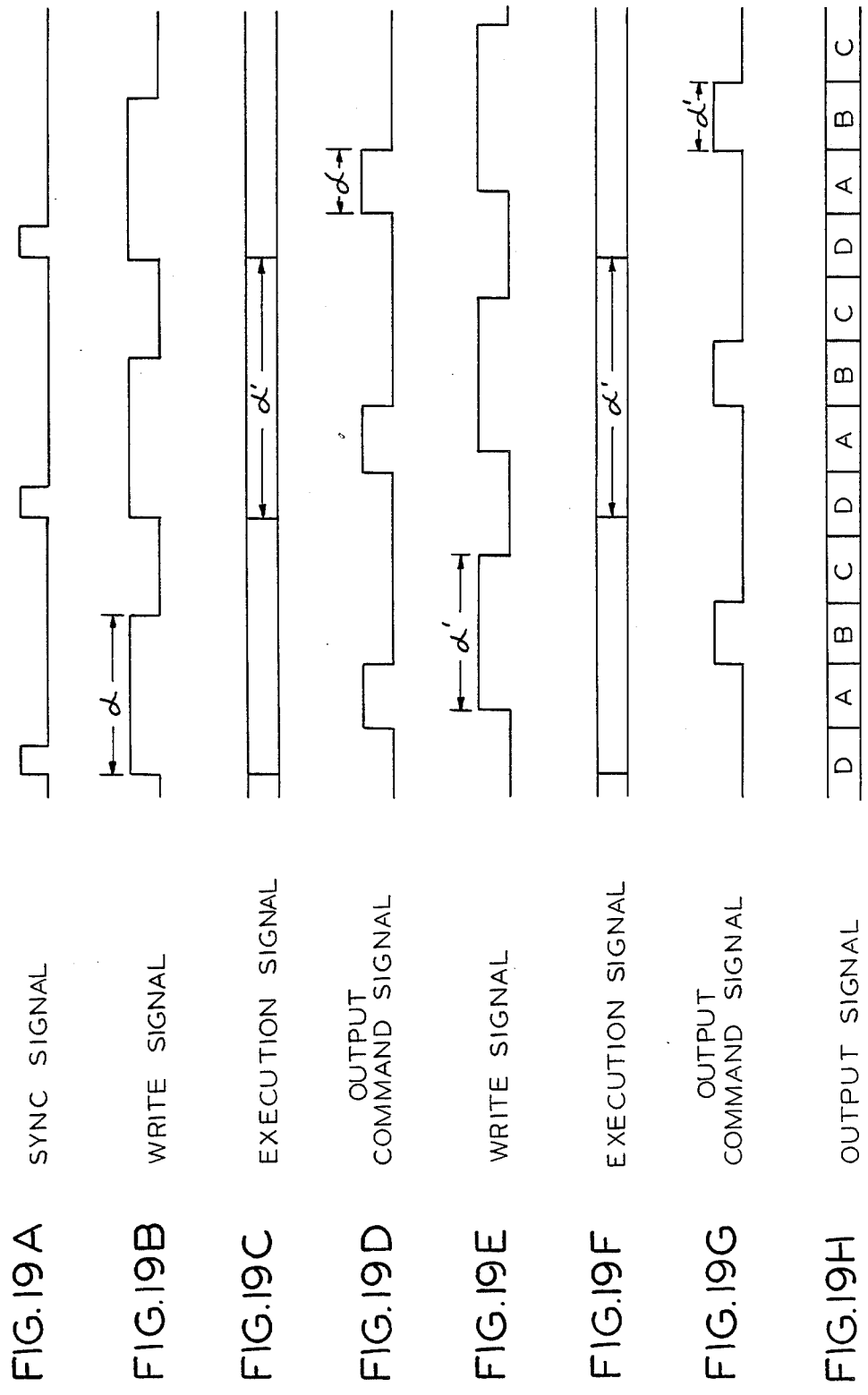

A sync signal (FIG. 19A) supplied to the terminal 1 marks the start of a frame. In the processor 3 responsible for the first picture block, the write signal (FIG. 19B) generated by the controller 13 rises simultaneously with the sync signal, and continues to command writing until the input picture block ends. The processing section 11 performs signal processing from the leading edge of the next sync signal to that of the still next sync signal. The controller 13 also supplies an output command signal (FIG. 19D) to the output section 12. This output command signal may as well be regarded as the position signal for the picture block to be processed by the processor 3. Thus data taken in during the period represented by $\alpha$ in FIG. 19B is processed during the period represented by $\alpha$ in FIG. 19C, and the result of processing is outputted during the period represented by $\alpha$ in FIG. 19D. As explained with reference to FIG. 1, the input picture block is generally greater than the processed picture block, so that, to compare the durations of the write signal and output command signal respectively corresponding to these blocks, the period during which the write signal is on is longer than that during which the output command signal is on.

The signals shown in FIGS. 19E and 19F are respectively the write signal and the output command signal for the processor 4. The relationship between these signals derives from the difference between the input block and the processed block, illustrated in FIG. 1. The processing by the section 11 of the processor 4 extends from the leading edge of the sync signal to that of the next sync signal, coinciding with the processing by the processing section 11 of the processor 3.

Whereas the control signals only for the processors 3 and 4 have so far been described, basically the same applied to the unit processors 5 and 6. Since each unit processor gives its output only while its output command signal is on, processed video signals are outputted from the output terminal 8 of FIG. 18 in the form illustrated in FIG. 19H. It is to be noted, however, that the parts marked A, B, C and D in FIG. 19H represent the outputs of the processors 3, 4, 5 and 6, respectively. Therefore, processed video signals are outputted without interruption from the terminal 8.

Figure 20:
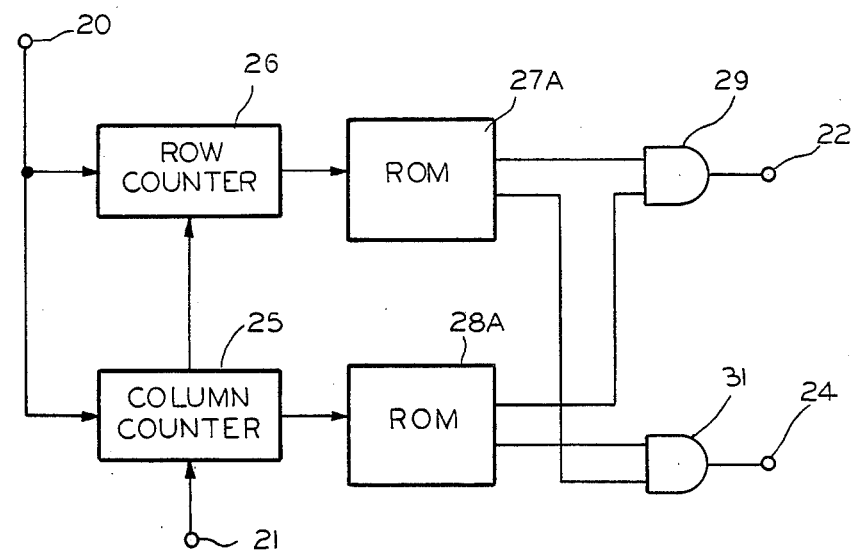
FIGS. 20 to 24 are parts of the fifth embodiment shown in FIG. 18.

Referring to FIG. 20, the controller 13 for use in the fifth embodiment in FIG. 18 comprises a sync signal input terminal 20, a clock signal input terminal 21, a write signal output terminal 22, an output command signal output terminal 24, a column counter 25, a row counter 26, ROMs 27A and 28A, and gate circuits 29 and 31.

The ROM 27A gives a two-bit output, of which the first bit is so programmed as to output "1" for an input address identical with the row number of the input picture block and "0" for everything else, and the second is so programmed as to output "1" for an input address identical with the row number of the processed picture block and "0" for everything else.

The ROM 28A similarly gives a two-bit output, of which the first bit is so programmed as to output "1" for an input address identical with the column number of the input picture block and "0" for everything else, and the second is so programmed as to output "1" for an input address identical with the column number of the processed picture block and "0" for everything else.

When a sync signal is entered from the terminal 20, the column and row counters 25 and 26 are reset, both outputting zero. To take up now, as an example, the controller 13 of the processor 3 responsible for the first picture block of FIG. 18, the ROM 28A produces, in response to a "0" of the column counter 25, "1" for the first and second bits representing the input and output picture blocks. The ROM 27A outputs, in response to a "0" of the row counter 26, "1" for the first and second bits, respectively representing the input and output picture blocks. As a result, the gates 29 and 31 produce "1" to the terminals 22 and 24.

Every time a sampled video signal is fed to the terminal 2 of FIG. 18, a signal is supplied to the clock terminal 21 of FIG. 20 to advance the column counter 25, which, upon completion of a column in a whole frame, advances the row counter 26 by one and returns to zero. The first bit of each of the ROM's 28A and 27A produces "1" as long as the column and row counters 25 and 26 indicate a column and a row, respectively, belonging to the input picture block, and the gate 29 therefore supplies "1" to the terminal 22 for a sample position belonging to the input block.

Similarly, when the column and row counters 25 and 26 indicate a column and a row, respectively, corresponding to the output picture block, the ROMs 28A and 27A produce "1"; and as a result the gate 31 supplies "1" as the outout command signal to the terminal 24.

Figure 21:
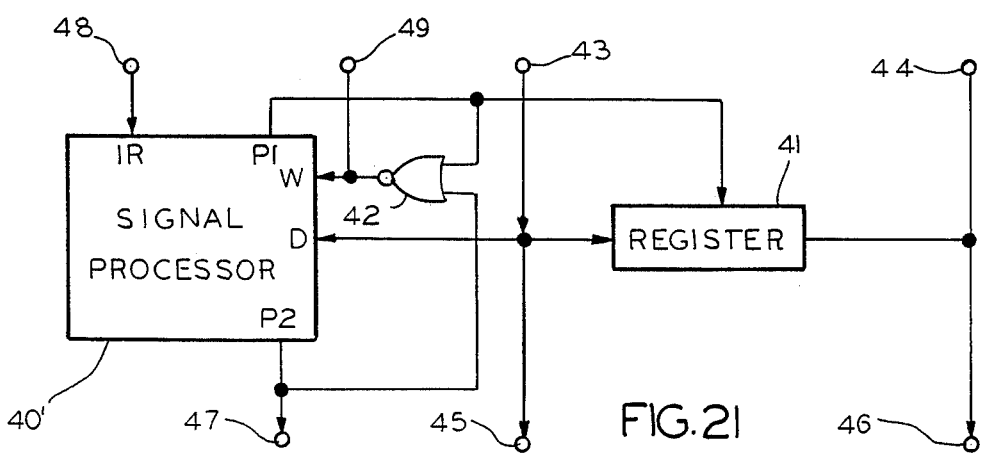

Referring to FIG. 21, the processing section 11 for use in the fifth embodiment shown in FIG. 18 includes a signal processor 40'; a register 41, a gate 42, a terminal 43 for input from the input section 10, a terminal 44 for address output to the input section 10, a terminal 45 for output to the output section 12, a terminal 46 for address output to the output section 12, terminal 47 for write signal to the output section 12, an command input terminal 48 and an output terminal 49 for a read-out signal to the input section 10. The $\mu$PD7720 processor or its equivalent is supposed to be used as the signal processor 40'.

The following description assumes the use of a $\mu$PD7721 processor as an equivalent of $\mu$PD7720. The $\mu$PD7721 processor has substantially the same function as $\mu$PD7720 except that it has no instruction ROM built into it, and operates according to an instruction taken in from an input terminal IR at every command cycle. Therefore, by supplying commands from the command generator 200 of FIG. 18 to the input terminal IR via the command terminal 48 of FIG. 21, the same function as $\mu$PD7720 can be achieved.

Now, as a command signal from the generator 200 of FIG. 18 is fed to the terminal 48 of FIG. 21, the signal processor 40' begins signal processing according to the command. As the ensuring operation is similar to the case illustrated in FIG. 5 where a $\mu$PD7720 processor is used, further description is dispensed with.

Figure 22:
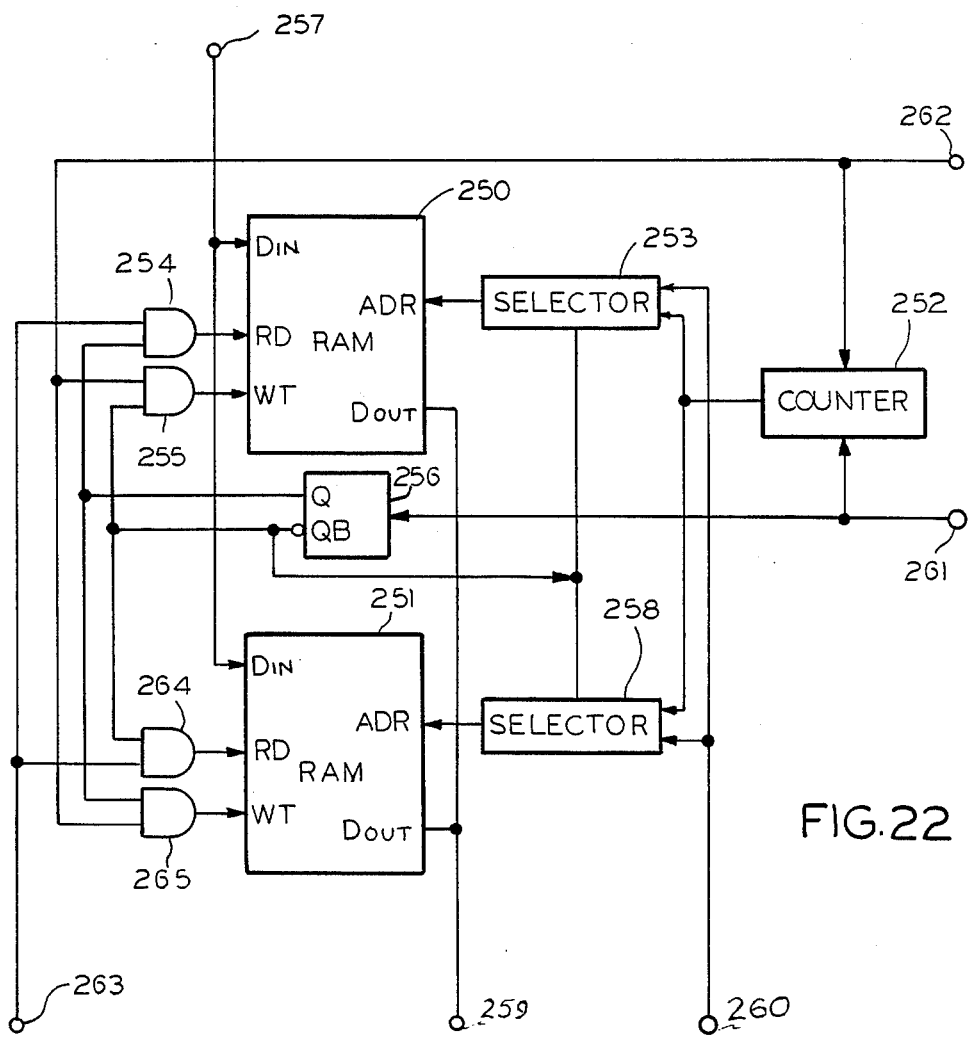

Referring to FIG. 22, the input section 10 of the fifth embodiment shown in FIG. 18 comprises two RAM's 250 and 251, a counter 252, selectors 253 and 258, gates 254, 255, 264 and 265, a flipflop 256, a video signal input terminal 257, an output terminal 259, an address input terminal 260, a sync signal input terminal 261, a write signal input terminal 262 and a read-out signal input terminal 263. Here, each of the RAM's 250 and 251 writes data on a terminal $D_{in}$ into an address given at a terminal ADR when "1" is inputted to a terminal WT, or produces data read out of an address given at the terminal to a terminal $D_{out}$ when "1" is inputted to a terminal RD. Further, when "0" is inputted to the terminal RD, the impedance at the terminal $D_{out}$ rises to a high level. The flipflop 256 has a positive logical output Q and a negative logical output QB, which are switched between each other at the leading edge of the input signal.

To the terminal 261 is supplied the sync signal shown in FIG. 19A, at whose leading edge the output of the flipflop 256 is reversed and the counter 252 is reset to zero.

In the arrangement illustrated in FIG. 22, a memory into which data on the terminal 257 are written and another memory to be accessed from the processing section 11 are switched between each other according to the output of the flipflop 256. The following description supposes that the RAM 250 takes in video signals and the RAM 251 is accessed from the processing section 11. Thus, the outputs Q and QB of the flipflop 256 being "0" and "1", respectively, the selectors 253 and 258 respectively select the counter 252 and the terminal 260, and the gates 254 and 265 inhibit reading out of the RAM 250 and writing into the RAM 251.

In this state, only as long as "1" is supplied from the controller 13 to the terminal 262, every time a sampled video signal is fed to the terminal 2 of FIG. 18, the counter 252 is advanced by one after the video signal from the terminal 257 is written into the RAM 250. Meanwhile, as long as "1" is supplied from the processing section 11 to the terminal 263, data are read out of the RAM 251 in response to an address supplied to the terminal 260. Thus, in the processing section 11, by supplying "1" to the terminal 263 of FIG. 22 after storing the address in the register 41 of FIG. 21, data are read out of the RAM 251 to the terminal 259. In this manner, video signals in the input picture block are written into the RAM 250 in the order of their inputting, and at the same time data can be read out of the RAM 251 as required by the processing section 11.

Then, as a sync signal is newly fed, the outputs Q and QB of the flipflop 256 turn "1" and "0", respectively, and the operations of the RAM's 250 and 251 are reversed. In this way, there is composed a so-called double-buffer memory, wherein a memory storing data at every sync signal and another to read out of the processing section are switched between each other.

Figure 23:
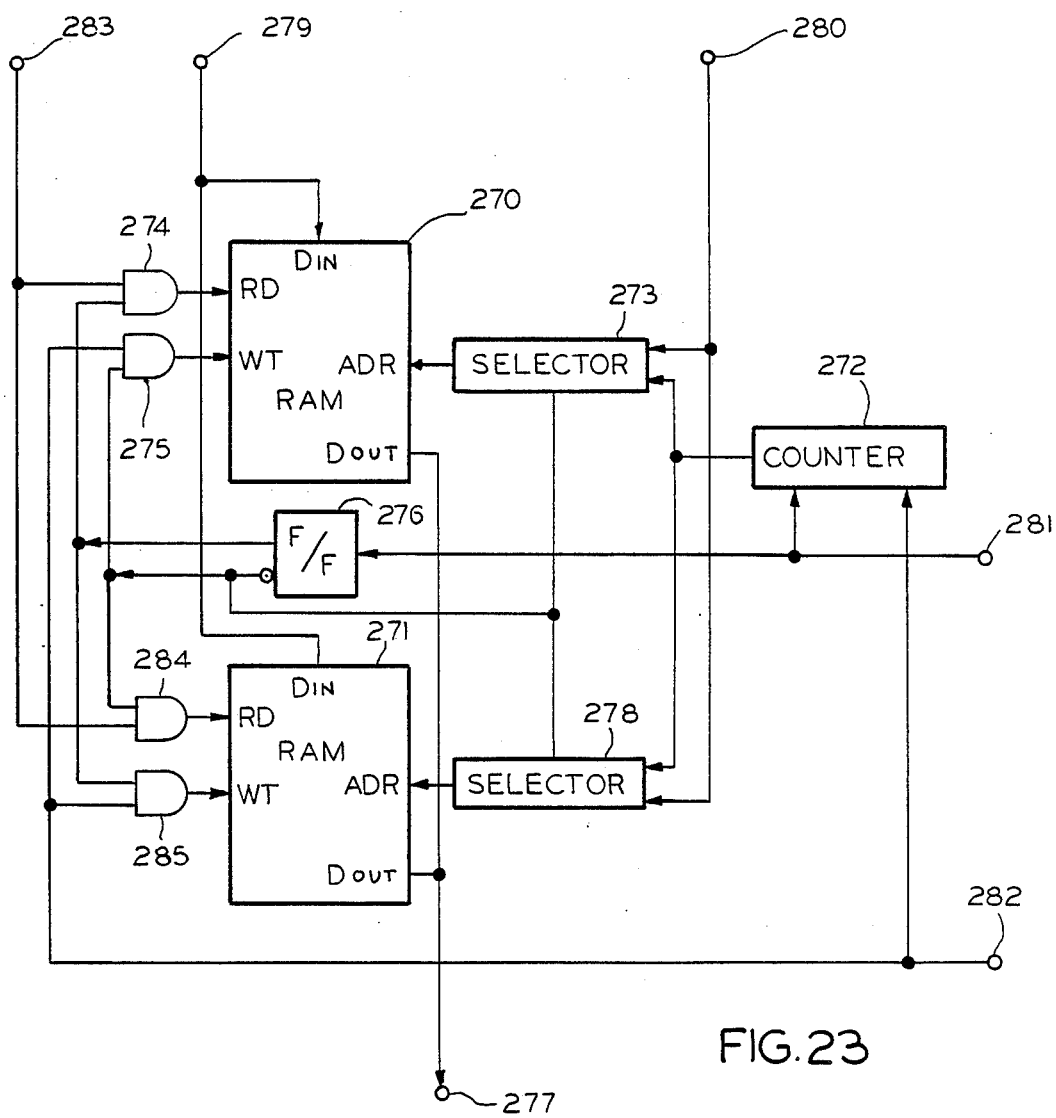

Referring to FIG. 23, the output section 12 of the fifth embodiment shown in FIG. 18 is made up of RAM's 270 and 271, a counter 272, selectors 273 and 278, gates 274, 275, 284 and 285, a flipflop 276, a coded signal input terminal 277, an input terminal 279, an address input terminal 280, a sync signal input terminal 281, an output command signal input terminal 282 and a write signal input terminal 283. Herein the RAM's 270 and 271 and the flipflop 276 have respectively the same functions as the RAM's 250 and 251 and the flipflop 256 in FIG. 22. To the terminal 281 is supplied the sync signal illustrated in FIG. 19A, at whose leading edge the output of the flipflop 276 is reversed and the counter 272 is reset to zero.

In the arrangement illustrated in FIG. 23, a memory out of which data are read onto the terminal 277 and another into which processed data from the processing section 11 are written are switched between each other according to the output of the flipflop 276. The following description supposes that the RAM 271 outputs video signals and the RAM 270 is accessed from the processing section 11. Thus, the outputs Q and QB of the flipflop 276 being "0" and "1", respectively, the selectors 278 and 273 respectively select the counter 272 and the terminal 280, and the gates 274 and 285 inhibit reading out of the RAM 270 and writing into the RAM 271.

In this state, only as long as "1" is supplied from the controller 13 to the terminal 282, every time a sampled video signal is fed to the terminal 2 of FIG. 18, the counter 272 is advanced by one after the video signal is read onto the terminal 277 from the RAM 271. Meanwhile, as long as "1" is supplied from the processing section 11 to the terminal 283, the data from the terminal 279 are written into the RAM 270 in response to an address supplied to the terminal 280. Thus, in the processing section 11, by supplying "1" to the terminal 263 of FIG. 23 after storing the address in the register 41 of FIG. 21, data on the input terminal 279 are written into the RAM 270. In this manner, processed data are read out of the RAM 271, and at the same time data can be written into the RAM 270 as required by the processing section 11.

Then, as a sync signal is newly fed, the outputs Q and QB of the flipflop 276 turn "1" and "0", respectively, and the operation of the RAM's 270 and 271 are reversed.

As hitherto described, since both the input memories and the output memories are double-buffer structured in the fifth embodiment, there is a two sample delay from the inputting of a video signal until the time the processing result can be observed.

Figure 24:
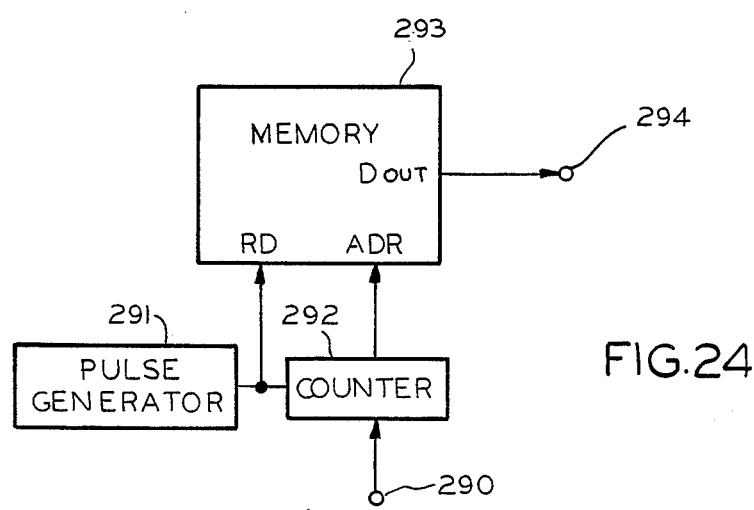

Referring to FIG. 24, the command generator 200 shown in FIG. 18 comprises a terminal 290 for receiving the sync signal; a counter 292 which is reset at the leading edge of the sync signal and counts up in response to an output pulse of a pulse generator 291; a command storage memory 293 for storing, in the order of execution, a plurality of commands given to the processors; and a terminal 294 to which are fed commands supplied from the terminal $D_{out}$ of the memory 293. As the sync signal is given to the terminal 290, the counter 292 is reset, "0" for example is supplied to the address terminal ADR of the memory 293 and the output of the oscillator 291 is fed to the read terminal RD of the memory 293, so that a command stored at an address "0" in the memory 293 is read out to the terminal 294. As the next pulse is supplied from the oscillator 291, the counter 292 is counted up by +1 for instance, and a command at an address "1" is read out to the terminal 294. The period of the pulse generated by the oscillator 291 is determined according to the command cycle of the signal processor 40'.

Incidentally, the embodiment shown in FIG. 18 is a variation of that of FIG. 2. Similarly, it obviously is possible also to achieve collective control, by commands from a command generator, of the actions of the processing sections 11 in the already described embodiments of FIGS. 8, 12 and 16 and another embodiment to be described below with reference to FIG. 24.

Sixth Embodiment

Figure 25:
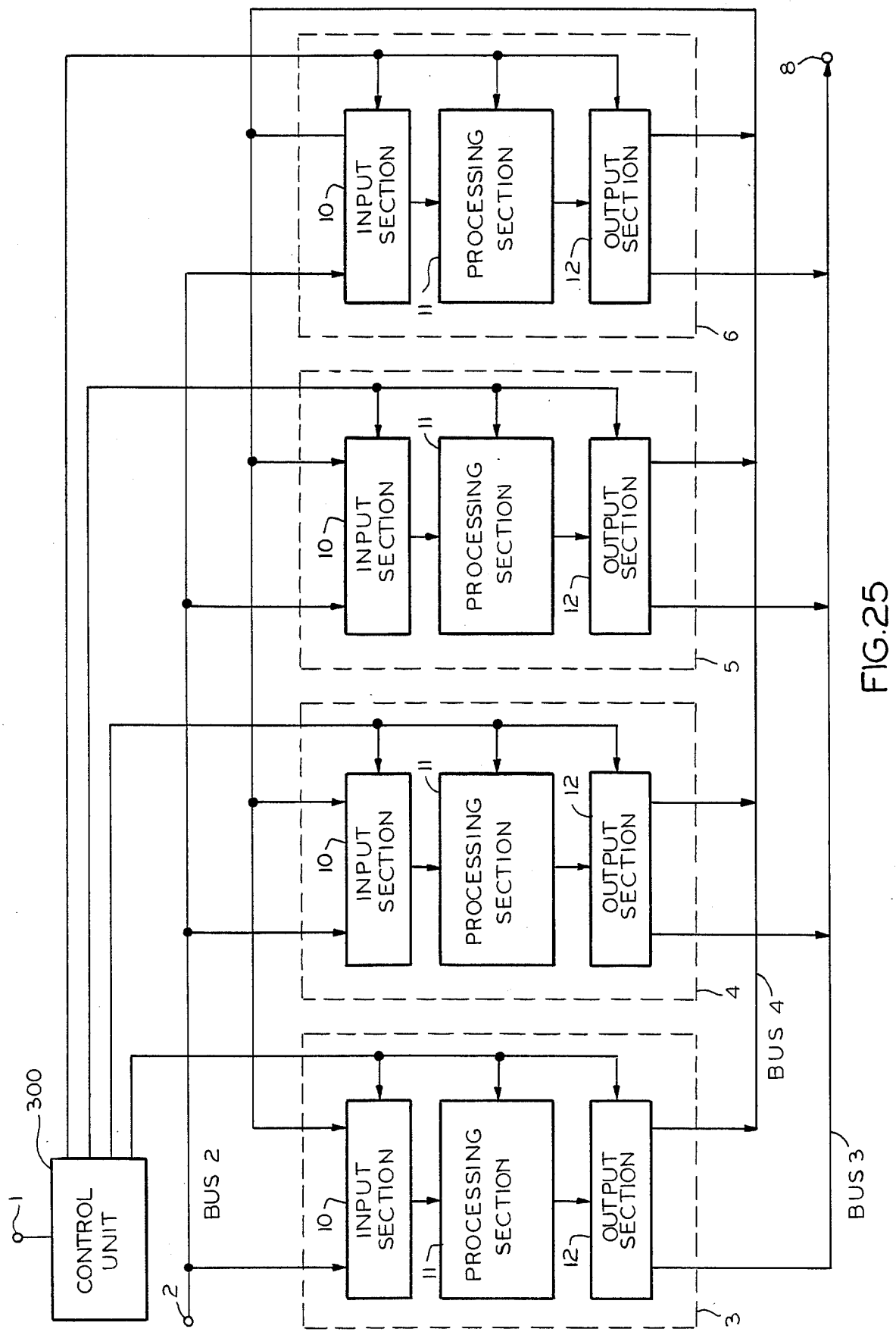
FIG. 25 is a block diagram of a sixth embodiment of the invention.

Referring to FIG. 25, a sixth embodiment of the invention has a single control unit which replaces the controllers 13 provided in every one of the unit processors 3, 4, 5 and 6 shown in FIG. 12. Although this sixth embodiment is based on the embodiment illustrated in FIG. 12, the present invention also covers versions of the embodiments of FIGS. 2, 8, 16 and 18 whose pluralities of controllers are replaced by one each of common control unit.

A sync signal supplied to the terminal 1 is entered into the control unit 300. The unit 300 detects the timing of the inputting of a video signal belonging to an input picture block assigned to each unit signal processor, and supplies the detected timing to the input section of each processor as a write signal.

The input section 10, in response to the write signal, takes in and stores the input video signal and locally decoded video signal from the bestBUS2 and BUS4, respectively.

The control unit 300, upon completion of the entry of these video signals, also supplies an execution signal to the processing section 11 of each unit processor. Upon receipt of the execution signal, the processing section 11 performs differential encoding using the input and locally decoded signal to produce an encoded signal and locally decoded signal, which are stored in the output section 12.

The control unit 300 further detects the output timing of a predetermined processed picture block based on the sync signal and gives an output command signal to the output section 12 of each processor when the processed picture block for the particular unit processor comes. The output section 12, upon receipt of the output command signal, sequentially supplies the encoded signal to the bus 3 and decoded signal to the bus 4.

The timing chart of the write signal, execution signal and output command signal, generated by the control unit 300, against the sync signal is the same as what is shown in FIGS. 13A to 13H.

Figure 26:
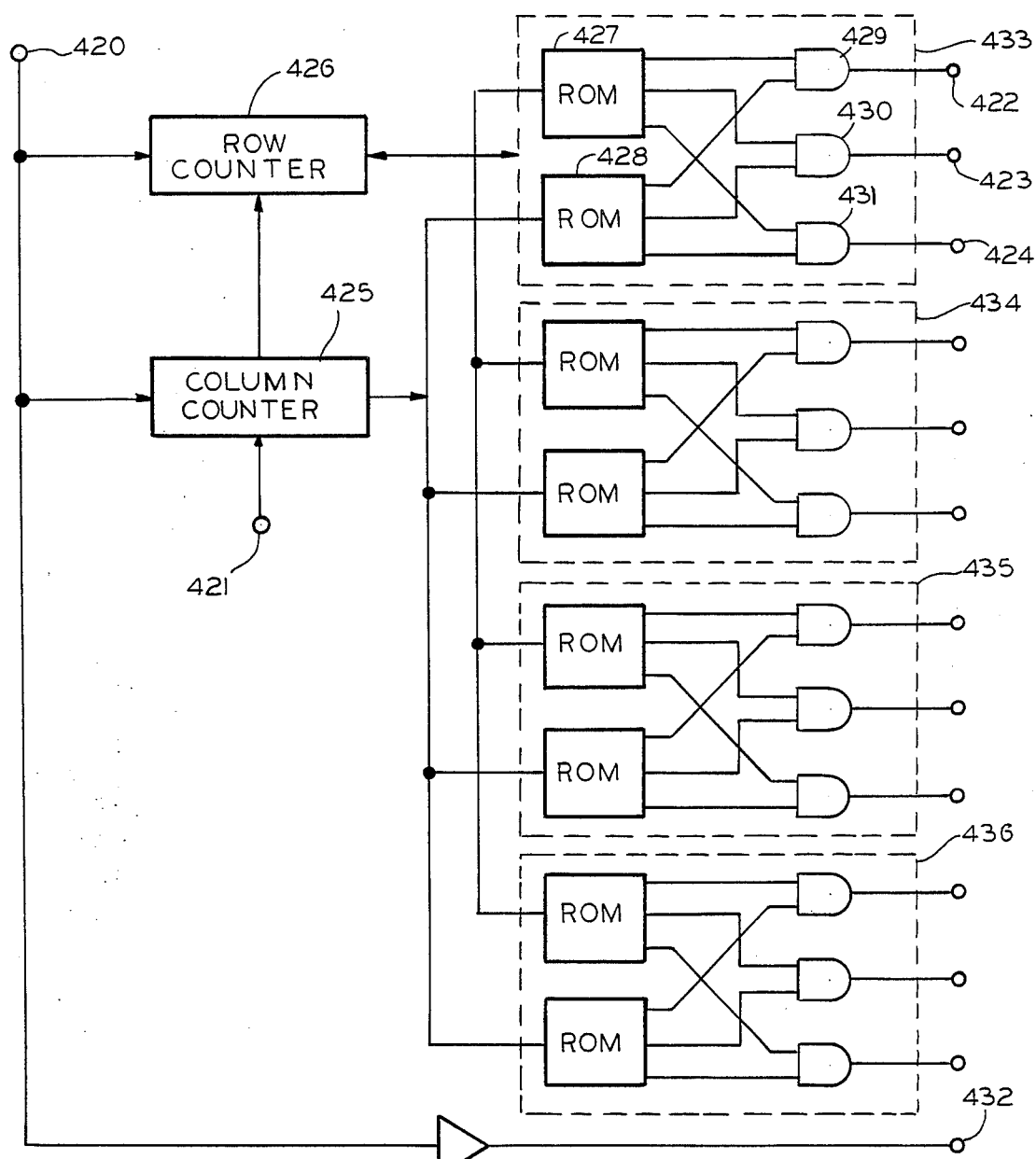
FIG. 26 is a block diagram of the control unit 300 shown in FIG. 25.

Referring to FIG. 26, the control unit 300 comprises a plurality of controller 433, 434, 435 and 436. Each controller comprises ROM's 427 and 428, gates 429, 430 and 431, a write signal output terminal 422, an execution command signal output terminal 423 and an output command signal output terminal 424, in addition to a sync signal input terminal 420, a clock signal input terminal 421, a column counter 425, a row counter 426 and a sync signal output terminal 432.

As would be evident from comparison of FIGS. 26 and 4, the ROM's 427 and 428 correspond to the ROM's 27 and 28, the gates 429, 430 and 431 to the gates 29, 30 and 31, and the terminals 422, 423 and 424 to the terminals 22, 23 and 24. Thus the control unit 300 has equivalents of the ROM's 27 and 28 and gates 22, 23 and 24 of FIG. 4 for each of the unit signal processors, and further is provided with one each of row counter 426 and column counter 425 for their common use. The numbers of the row counters and column counters are thereby reduced. The ROM's 427 and 428 may be replaced with RAM's.

If it is desired to set the sizes of the input picture block and of the auxiliary picture block independently of each other for the embodiment of FIG. 25, the control unit 300 shall be so structured as to generate two control signals in the input section 10 of each unit processor, one for input picture blocks and the other for auxiliary picture blocks. This structure can be achieved by using four-bit output ROM's as the ROM's 427 and 428 of FIG. 26, so that an input control signal for auxiliary picture blocks can be generated with a gate for performing an AND operation between the additional bits, and by providing a pair each of the counters 152, selectors 153 and write command signal input terminals 162 to be shared by the RAM's 150 and 151 in the structure of FIG. 14.

As hitherto described, the present invention makes it possible to achieve sophisticated DSP of video signals with a plurality of unit signal processors without need for communication among them and without affecting DSP in the border zones between the unit signal processors.

Further according to the invention, video signals can be written into each unit signal processor directly from the video signal bus, dispensing with an extra processor, such as the sunervisory processor in the parallel image processor. Moreover, processed video signals are supplied from each unit signal processor directly to the output bus, instead of going through a supervisory processor as in the parallel image processor. As a result, digital processing of video signals is made possible with a delay of no more than one or two frames, and the real time feature is thereby retained. The amount of hardware is also reduced by what corresponds to the root computer or the supervisory processor which is dispensed with.

The unit signal processors arranged in parallel differ from one another only in the assignment of input and processed picture blocks, and the processing sections of all the unit signal processors are to perform processing by the same DSP program, so that the program has to be developed for only one unit signal processor, the others needing only the copies of the developed program, resulting in facilitation of programming. Especially in the structure where a command generator collectively controls commands to a plurality of unit processors, programming is even more facilitated.

Furthermore, since the input and processed picture blocks differ from one unit signal processor to another, it is possible to provide a large number of unit signal processors in parallel, prohibit any unit signal processor that may be in trouble from giving output, and remedy the trouble only by altering the definitions of the input and processed picture blocks of another unit signal processor which is in reserve. As a result, the digital signal processor according to the invention can also be utilized as a high-reliability processor.

What is claimed is:

1. A real time video signal processor for processing video signals such as television signals, said video signals having successive frames, each of said frames comprising a plurality of blocks of video signals, said processor comprising:

a plurality of unit processors, a signal line for supplying a synchronization signal indicating a beginning of the input frame to each of said plurality of unit processors, and a data bus for supplying said video signals to said plurality of unit processors, each of said unit processors comprising:

an input section for receiving said frames and storing a corresponding predetermined one of said plurality of blocks of video signals constituting part of an input one of said frames in response to a predetermined one of a first plurality of position signals indicating the position of said corresponding predetermined one of the plurality of blocks of video signals in the input frame, a processing section for processing said predetermined one of the blocks of video signals stored in the input section to produce a processed block of video signals, and an output section for storing the processed block of video signals and outputting the processed block of video signals in response to a predetermined one of a second plurality of position signals indicating the position of the processed block of video signals in an output frame of video signals; and a control section for supplying, in response to said synchronization signal, the predetermined one of said first and second plurality of position signals.

2. A real time video signal processor as claimed in claim 1, wherein there is overlapping between said blocks of video signals stored in the input sections.

3. A real time video signal processor as claimed in claim 1, wherein said plurality of control sections consists of a plurality of controllers each respectively associated with one of said plurality of unit processors.

4. A real time video signal processor as claimed in claim 1 further comprising:

first delay means comprising a first plurality of delay circuits for receiving said frames and providing said frames at respective outputs to the input sections and for delaying said synchronization signal; and second delay means comprising a second plurality of delay circuits for receiving the processed blocks of video signals from the output sections at respective inputs.

5. A real time video signal processor as claimed in claim 1, wherein the processing section of each of said plurality of unit processors includes a signal processor with a program to provide said processing.

6. A real time video signal processor as claimed in claim 1, further comprising a command generator for generating a plurality of sequences of command signals for controlling said processor.

7. A real time video signal processor as claimed in claim 1, wherein there is overlapping between respective processed blocks of video signals produced by the processing sections in the plurality of unit processors.

8. A real time video signal processor as claimed in claim 7 further comprising adding means for adding all the outputs of said plurality of unit processors.

9. A real time video signal processor as claimed in claim 1, wherein said input section is composed of first input means for storing said corresponding predetermined one of the plurality of blocks of video signals in response to the predetermined one of the first plurality of position signals, and second input means for storing a respective auxiliary input block of video signals in response to said first position signal, said processing section including means for generating the processed block of video signals and a processed auxiliary block of video signals by processing said predetermined one of said plurality of blocks of video signals and the respective auxiliary block video signal, said output section being composed of means for storing the processed block of video signals and the processed auxiliary block of video signals generated by the respective processing section.

* * * * *